(12) United States Patent
Ono

(10) Patent No.: US 10,185,082 B2
(45) Date of Patent: Jan. 22, 2019

(54) OPTICAL WAVEGUIDE APPARATUS

(71) Applicant: SHINKO ELECTRIC INDUSTRIES CO., LTD., Nagano-shi, Nagano (JP)

(72) Inventor: Yusuke Ono, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days.

(21) Appl. No.: 15/957,230

(22) Filed: Apr. 19, 2018

(65) Prior Publication Data

US 2018/0314002 A1   Nov. 1, 2018

(30) Foreign Application Priority Data

Apr. 28, 2017   (JP) .................. 2017-089792

(51) Int. Cl.
  *G02B 6/02*    (2006.01)
  *G02B 6/122*   (2006.01)
  *G02B 6/42*    (2006.01)

(52) U.S. Cl.
  CPC ......... *G02B 6/02333* (2013.01); *G02B 6/122* (2013.01); *G02B 6/4214* (2013.01)

(58) Field of Classification Search
  CPC ... G02B 6/02333; G02B 6/122; G02B 6/4214
  See application file for complete search history.

(56) References Cited

U.S. PATENT DOCUMENTS

| | | | | |
|---|---|---|---|---|
| 6,306,563 | B1* | 10/2001 | Xu | C08F 22/18 385/122 |
| 7,011,932 | B2* | 3/2006 | Ferm | G02B 6/1221 385/130 |
| 2002/0136526 | A1* | 9/2002 | Pottebaum | C08F 220/22 385/143 |
| 2006/0098926 | A1* | 5/2006 | Shelnut | G02B 6/138 385/129 |
| 2006/0210213 | A1* | 9/2006 | Huang | G02B 6/4206 385/14 |
| 2006/0210216 | A1* | 9/2006 | Lee | G02B 6/12002 385/14 |
| 2010/0129036 | A1* | 5/2010 | Hodono | B32B 38/1841 385/88 |
| 2010/0316330 | A1* | 12/2010 | Kim | G02B 6/138 385/14 |
| 2012/0314990 | A1* | 12/2012 | Pitwon | G02B 6/1221 385/14 |

FOREIGN PATENT DOCUMENTS

JP    2011-118163    6/2011

* cited by examiner

*Primary Examiner* — Daniel Petkovsek
(74) *Attorney, Agent, or Firm* — Rankin, Hill & Clark LLP

(57) ABSTRACT

There is provided an optical waveguide apparatus. The optical waveguide apparatus includes: a first clad layer; a core layer formed on the first clad layer; and a second clad layer formed on the first clad layer to cover the core layer. At least one of the first clad layer and the second clad layer includes a fully cured portion and a semi-cured portion.

12 Claims, 33 Drawing Sheets

(SECTIONAL VIEW)

(SECTIONAL VIEW)

(SECTIONAL VIEW)

(SECTIONAL VIEW)

(SECTIONAL VIEW)

(SECTIONAL VIEW)

(SECTIONAL VIEW)

(SECTIONAL VIEW)

(FIRST PHOTOMASK)

(SECOND PHOTOMASK)

(SECTIONAL VIEW)

(PHOTOMASK)

(FIRST GRAY TONE MASK)

(SECOND GRAY TONE MASK)

US 10,185,082 B2

OPTICAL WAVEGUIDE APPARATUS

This application claims priority from Japanese Patent Application No. 2017-089792, filed on Apr. 28, 2017, the entire contents of which are herein incorporated by reference.

BACKGROUND

1. Technical Field

The present disclosure relates to an optical waveguide apparatus.

2. Background Art

In the background art, there is provided an optical waveguide apparatus in which an optical waveguide for transmitting an optical signal is formed on a wiring substrate for transmitting an electric signal. The optical waveguide apparatus is a photoelectric composite substrate which can transmit the optical signal through a high-speed portion in order to compensate for a limit of transmission speed of the electric signal.

Optical path converting mirrors are disposed on end sides of the optical waveguide, and optical devices are mounted on the wiring substrate so as to be optically coupled to the optical path converting mirrors of the optical waveguide respectively (see e.g., JP-A-2011-118163).

As will be described in an undermentioned preliminary matter, a first clad layer, core layers and a second clad layer are formed in order from bottom to top in the optical waveguide apparatus. An outer peripheral portion of the second clad layer is disposed on an upper surface of the first clad layer.

Therefore, when a TC test (Thermal Cycle test) is performed, stress is apt to be concentrated at contact portions between side surfaces of the outer peripheral portion of the second clad layer and the upper surface of the first clad layer.

As a result, cracking may occur in the first clad layer, or the second clad layer may be peeled off from the first clad layer, thereby resulting in lowering of a manufacturing yield and insufficient reliability.

SUMMARY

According to one or more aspects of the present disclosure, there is provided an optical waveguide apparatus.

The optical waveguide apparatus comprises:

a first clad layer;

a core layer formed on the first clad layer; and a second clad layer formed on the first clad layer to cover the core layer.

At least one of the first clad layer and the second clad layer comprises a fully cured portion and a semi-cured portion.

DETAILED DESCRIPTION

Embodiments will be described below with reference to the accompanying drawings.

A preliminary matter underlying the embodiments will be described prior to description of the embodiments. Description of the preliminary matter is about the details of personal study of the present inventor, which contain novel techniques rather than known techniques.

FIGS. 1 to 4 are views showing a method for manufacturing an optical waveguide apparatus according to the preliminary matter. In each of FIGS. 1 to 4, an upper drawing is a plan view while a lower drawing is a sectional view.

Figure 1:
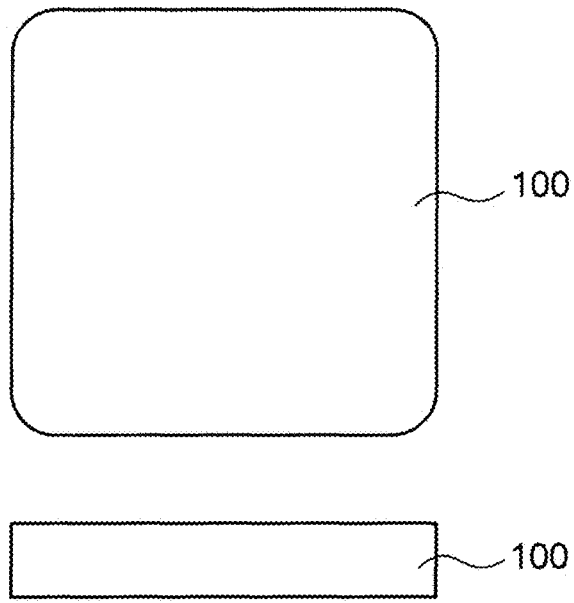
FIG. 1 is a plan view and a sectional view (Part 1) showing a method for manufacturing an optical waveguide apparatus according to a preliminary matter.

In the method for manufacturing the optical waveguide apparatus according to the preliminary matter, first, a wiring substrate 100 is prepared, as shown in FIG. 1. The wiring substrate 100 is a substrate which deals with an electric signal. Wiring layers (not shown) are formed in opposite surfaces of the wiring substrate 100 respectively.

Figure 2:
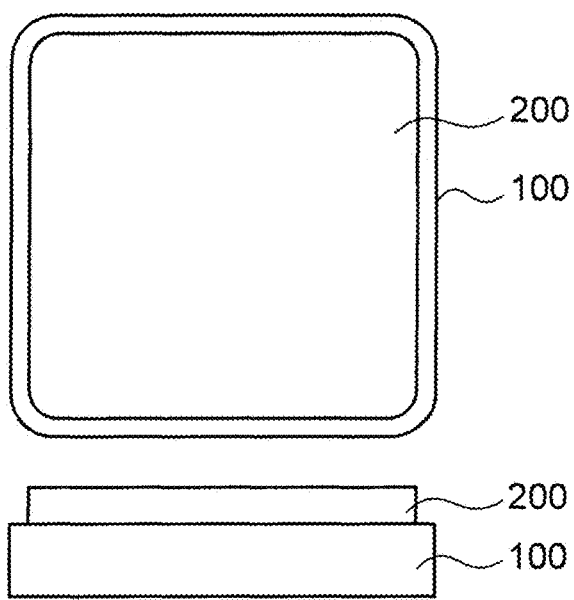
FIG. 2 is a plan view and a sectional view (Part 2) showing the method for manufacturing the optical waveguide apparatus according to the preliminary matter.

Next, a first clad layer 200 is formed on the wiring substrate 100, as shown in FIG. 2. A photocurable resin is completely cured so that the first clad layer 200 is obtained.

Figure 3:
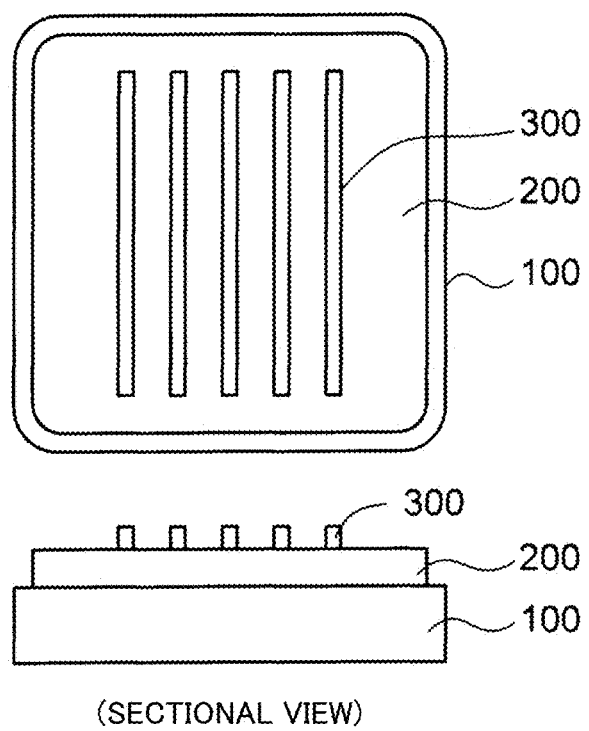
FIG. 3 is a plan view and a sectional view (Part 3) showing the method for manufacturing the optical waveguide apparatus according to the preliminary matter.

Further, core layers 300 are formed on the first clad layer 200, as shown in FIG. 3. A photocurable resin is irradiated with ultraviolet light through a photomask, and then developed. Thus, the photocurable resin is patterned into strips so that the core layers 300 are formed.

Figure 4:
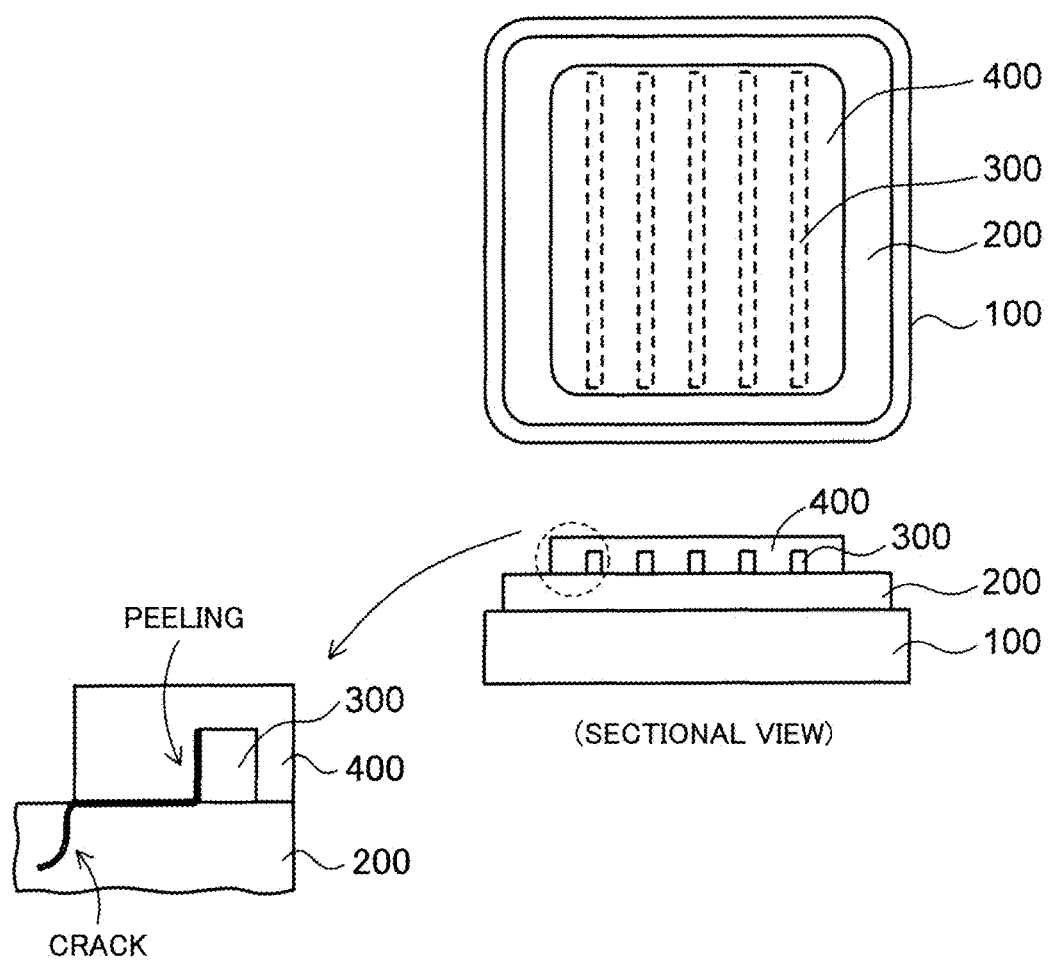
FIG. 4 is a plan view and a sectional view (Part 4) showing the method for manufacturing the optical waveguide apparatus according to the preliminary matter.

Successively, a second clad layer 400 is formed on the first clad layer 200 to cover the core layers 300, as shown in FIG. 4. A photocurable resin is completely cured in a manner similar to or the same as the first clad layer 200 so that the second clad layer 400 is obtained.

An area of the second clad layer 400 is set to be smaller than an area of the first clad layer 200. An outer peripheral portion of the second clad layer 400 is disposed on an upper surface of the first clad layer 200. In other words, the second clad layer 400 is formed on the first clad layer 200 so that the surface of the first clad layer 200 is partially exposed from the second clad layer 400.

As described above, each of the first clad layer 200 and the second clad layer 400 is formed of the resin which has been completely cured. Therefore, when a TC test (Thermal Cycle test) is performed on an optical waveguide shown in FIG. 4, stress is apt to be concentrated at contact portions between side surfaces of the outer peripheral portion of the second clad layer 400 and the upper surface of the first clad layer 200.

Therefore, cracking is apt to occur inside the first clad layer 200 from the contact portions of the first clad layer 200 with the side surfaces of the outer peripheral portion of the second clad layer 400.

Moreover, in some cases, the outer peripheral portion of the second clad layer 400 may be peeled off from the first clad layer 200 and the core layers 300 particularly due to the stress applied to the outer peripheral portion of the second clad layer 400.

Thus, the cracking may occur in the first clad layer 200 or the second clad layer 400 may be peeled off from the optical waveguide apparatus having the structure shown in FIG. 4, thereby resulting in lowering of a manufacturing yield and insufficient reliability.

The aforementioned problems can be solved by an optical waveguide apparatus according to any of the embodiments which will be described below.

First Embodiment

Figure 12:
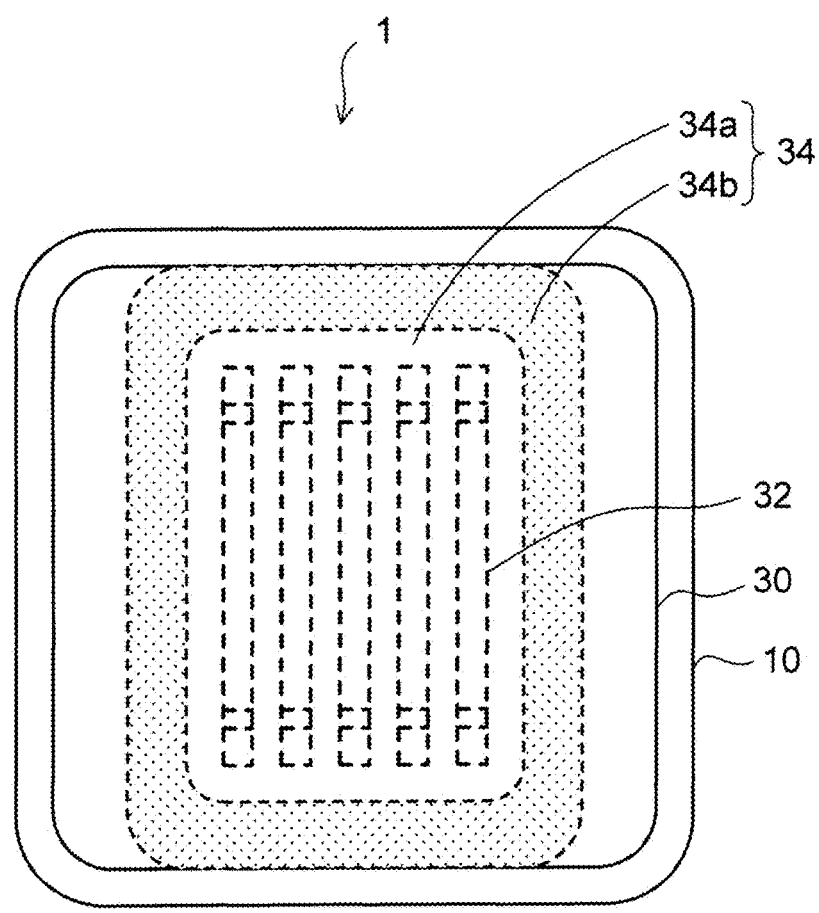
FIG. 12 is a plan view showing the optical waveguide apparatus according to the first embodiment.
Figure 13:
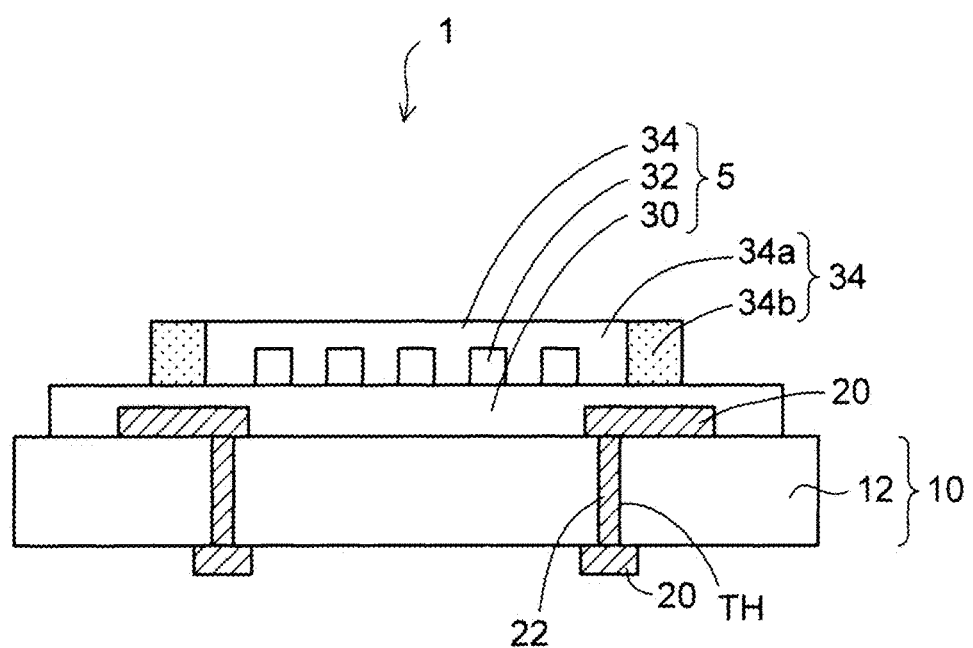
FIG. 13 is a sectional view showing the optical waveguide apparatus according to the first embodiment.

FIGS. 5A to 11B are views showing a method for manufacturing an optical waveguide apparatus according to a first embodiment. FIG. 12 and FIG. 13 are views showing the optical waveguide apparatus according to the first embodiment. The structure of the optical waveguide apparatus will be described below together with description of the method for manufacturing the optical waveguide apparatus.

Figure 5A:
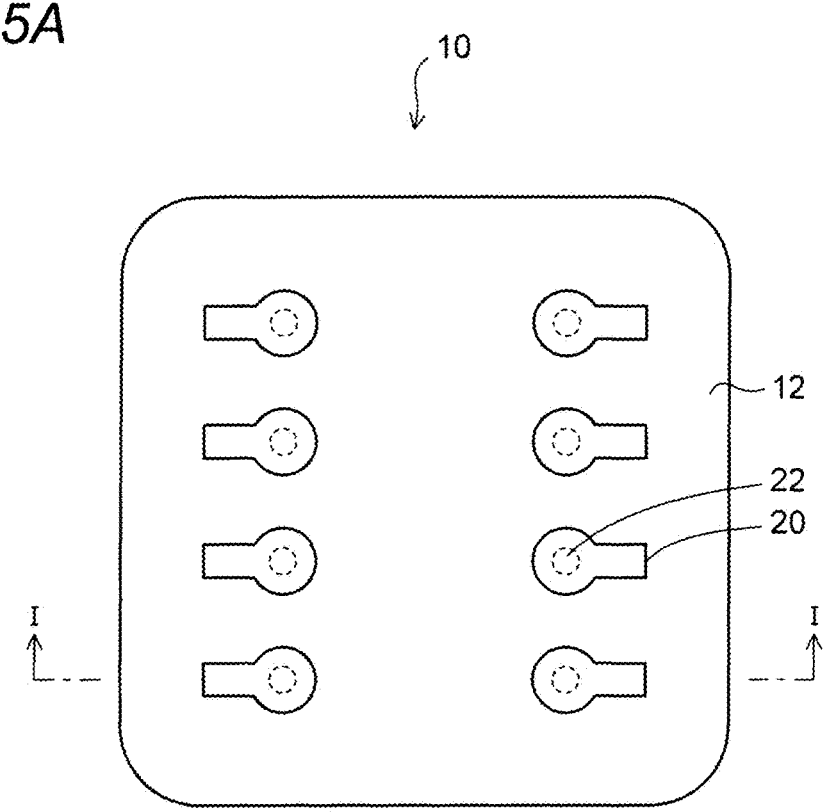
FIG. 5A is a plan view (Part 1) showing a method for manufacturing an optical waveguide apparatus according to a first embodiment.
Figure 5B:
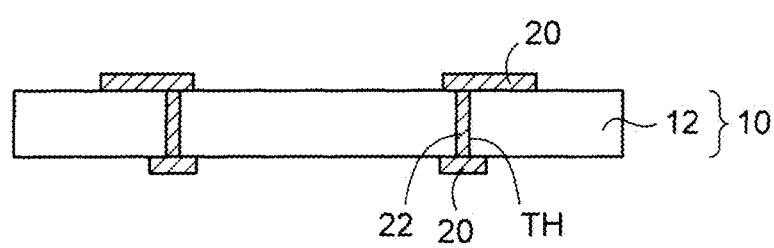
FIG. 5B is a sectional view (Part 1) showing a method for manufacturing an optical waveguide apparatus according to a first embodiment.

In the method for manufacturing the optical waveguide apparatus according to the first embodiment, first, a wiring substrate 10 which deals with an electric signal is prepared, as shown in FIGS. 5A and 5B. FIG. 5A is a plan view. FIG. 5B is a sectional view taken along a line of FIG. 5A. The same thing will be also applied to the subsequent drawings corresponding to FIGS. 5A and 5B.

In the wiring substrate 10, a wiring layer 20 is formed on each of opposite surfaces of an insulating substrate 12, as shown in FIGS. 5A and 5B. Through holes TH are provided in the insulating substrate 12 to penetrate the insulating substrate 12 in a thickness direction. The through holes TH are filled with through conductors 22. The wiring layers 20 on the opposite surface sides are connected to each other through the through conductors 22. The wiring layers 20 and the through conductors 22 are formed of copper or the like.

Alternatively, the wiring layers 20 on the opposite surface sides may be connected to each other via through hole plating layers formed on side walls of the through holes TH, and the remaining holes of the through holes TH may be filled with a resin.

In addition, the insulating substrate 12 may be a rigid substrate or may be a flexible substrate. When the rigid substrate is used as the insulating substrate 12, the insulating substrate 12 is formed, for example, of a glass epoxy resin or the like.

On the other hand, when the flexible substrate is used as the insulating substrate 12, the insulating substrate 12 is formed, for example, of a polyimide film or the like. In addition, the number of wiring layers 20 to be disposed on each of the opposite surface sides of the insulating substrate 12 can be set desirably.

The through holes TH of the wiring substrate 10 are formed by a drill, laser, or the like. The wiring layers 20 and the through conductors 22 are formed by photolithography and plating techniques or the like.

Figure 6A:
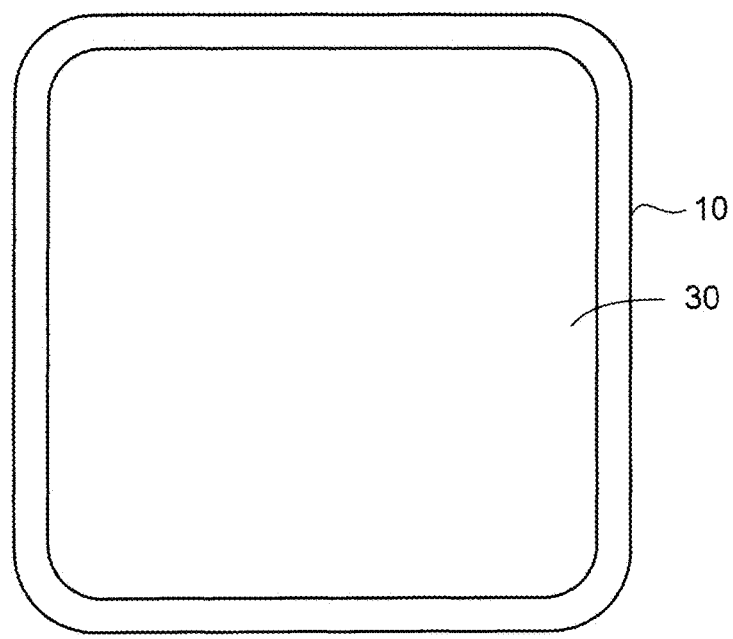
FIG. 6A is a plan view (Part 2) showing the method for manufacturing the optical waveguide apparatus according to the first embodiment.
Figure 6B:
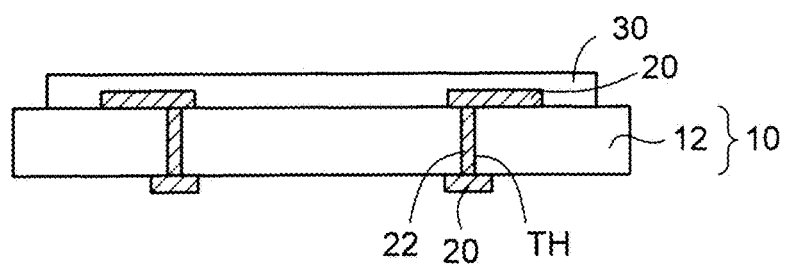
FIG. 6B is a sectional view (Part 2) showing the method for manufacturing the optical waveguide apparatus according to the first embodiment.

Next, a first clad layer 30 is formed on the wiring substrate 10, as shown in FIGS. 6A and 6B. A photocurable resin is irradiated with ultraviolet light, and then subjected to heat treatment at a temperature of 100° C. to 150° C. so as to be fully cured. Thus, the first clad layer 30 is obtained. The term "fully cured" represents a state in which the photocurable resin is completely cured by the light exposure and the heat treatment.

The first clad layer 30 may be patterned to adjust an outer shape thereof. In this case, the photocurable resin is irradiated with ultraviolet light through a photomask and then developed. Thus, the first clad layer 30 is obtained.

In the first embodiment, the entire first clad layer 30 is formed in the fully cured state.

As a method for forming the photocurable resin, a resin sheet may be disposed, or a liquid resin may be applied. The first clad layer 30 is, for example, about 10 μm to 30 μm thick.

Figure 7A:
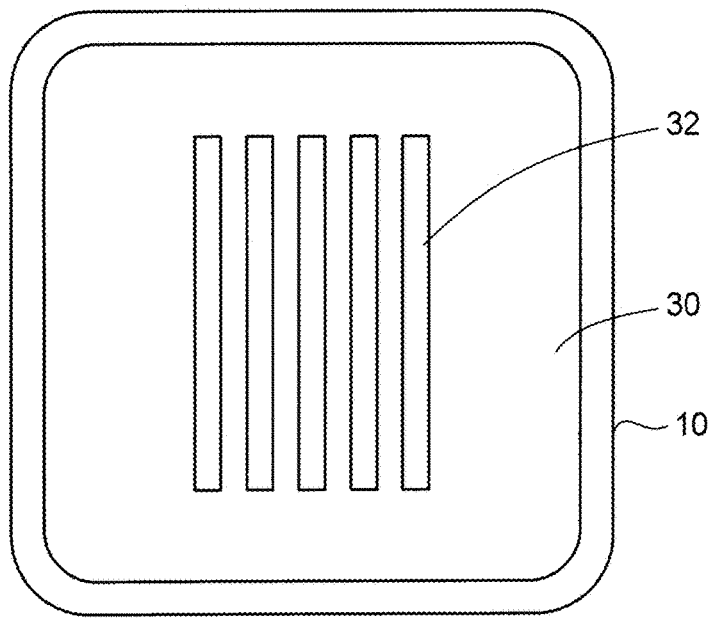
FIG. 7A is a plan view (Part 3) showing the method for manufacturing the optical waveguide apparatus according to the first embodiment.
Figure 7B:
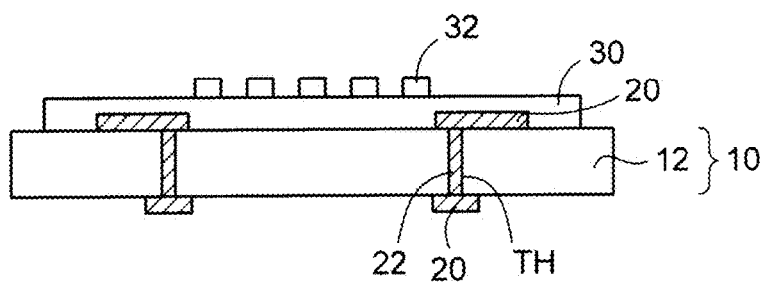
FIG. 7B is a sectional view (Part 3) showing the method for manufacturing the optical waveguide apparatus according to the first embodiment.

Successively, as shown in FIGS. 7A and 7B, a photocurable resin (not shown) for obtaining core layers is formed on the first clad layer 30. Further, the photocurable resin is irradiated with ultraviolet light through a photomask and then developed. Then, the photocurable resin is subjected to heat treatment at a temperature of about 100° C. to 150° C. so as to be fully cured.

Thus, a plurality of core layers 32 are arranged and disposed side by side as strip-like patterns on the first clad layer 30. The entire core layers 32 are formed in the fully cured state.

For example, each of the core layers 32 is set to be 5 μm to 50 μm wide and set to be 5 μm to 50 μm thick.

Figure 8A:
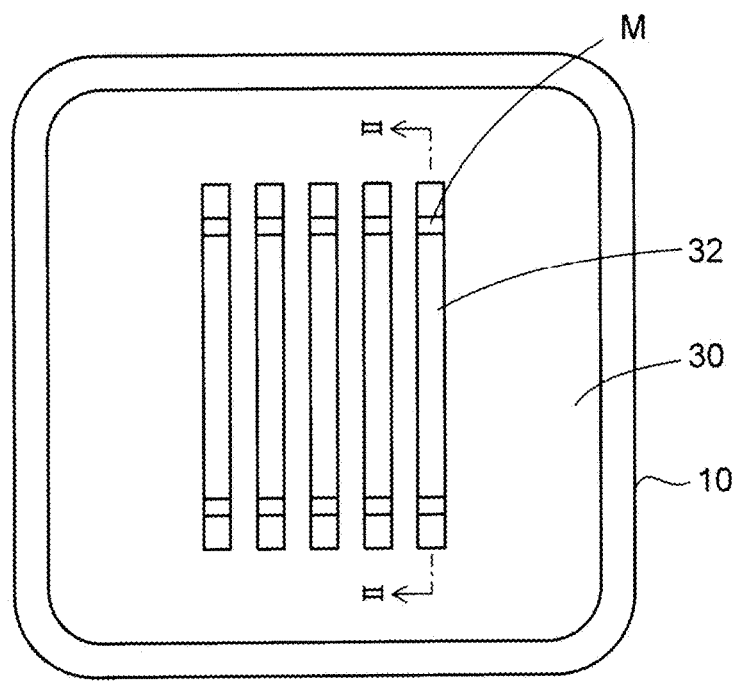
FIG. 8A is a plan view (Part 4) showing the method for manufacturing the optical waveguide apparatus according to the first embodiment.
Figure 8B:
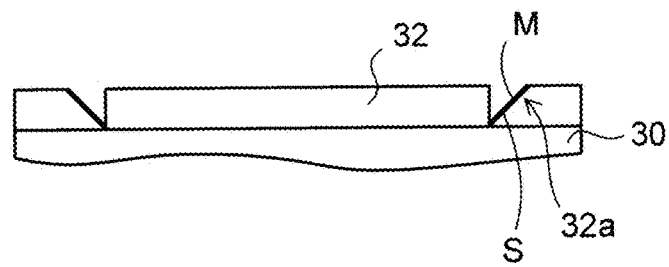
FIG. 8B is a sectional view (Part 4) showing the method for manufacturing the optical waveguide apparatus according to the first embodiment.

Next, as shown in FIGS. 8A and 8B, each of the core layers 32 is machined in the thickness direction from its surface by a rotary blade (not shown) of a cutting apparatus. Thus, V-shaped groove portions 32a provided with slopes S for converting optical paths by 90° are formed in the core layer 32. The groove portions 32a are formed at opposite end portions of the core layer 32, where optical path converting mirrors should be disposed. FIG. 8B is a sectional view taken along a line II-II of the plan view of FIG. 8A.

Further, light-reflective metal layers are formed partially on the slopes S of the groove portions 32a of the core layer 32 by mask vapor deposition or the like. Thus, the optical path converting mirrors M are obtained. Gold or aluminum etc. can be used as the light-reflective metal.

Figure 9A:
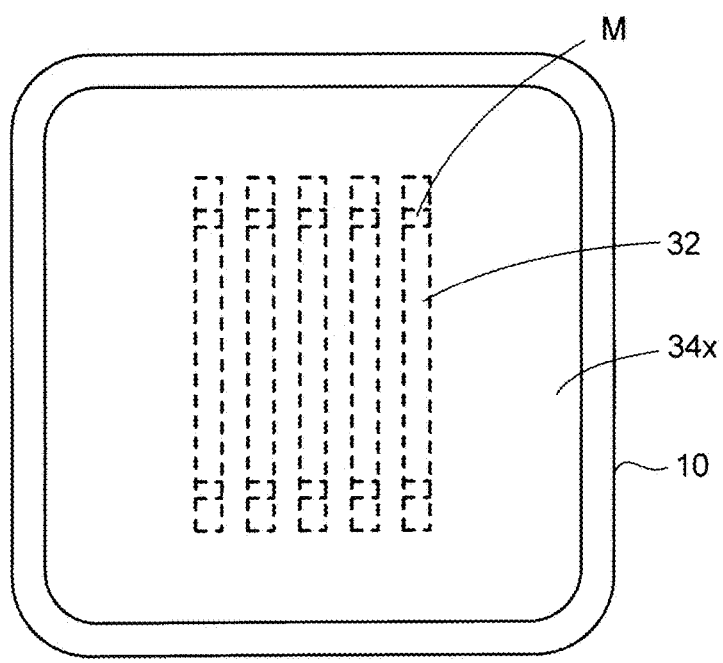
FIG. 9A is a plan view (Part 5) showing the method for manufacturing the optical waveguide apparatus according to the first embodiment.
Figure 9B:
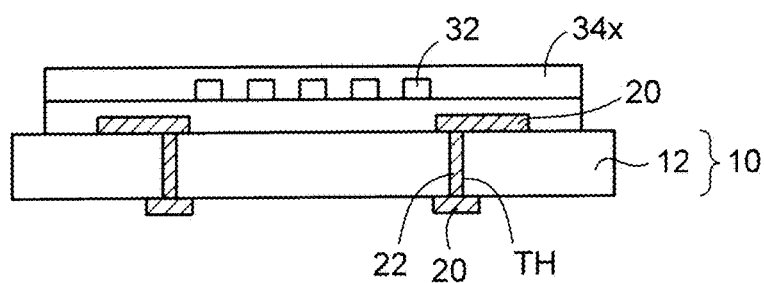
FIG. 9B is a sectional view (Part 5) showing the method for manufacturing the optical waveguide apparatus according to the first embodiment.

Next, as shown in FIGS. 9A and 9B, a photocurable resin 34x for obtaining a second clad layer 34 is formed on the first clad layer 30 and the core layers 32. The photocurable resin 34x is formed with its upper surface flat in a state in which the photocurable resin 34x covers upper surfaces and side surfaces of the core layers 32.

In a step of FIGS. 9A and 9B, the entire photocurable resin 34x is uncured. The term "uncured" represents a state in which the photocurable resin is not subjected to irradiation with ultraviolet light and heat treatment at all.

As the photocurable resin 34x, for example, a negative type photosensitive epoxy resin or polyimide resin or the like can be used. A similar photocurable resin or the same photocurable resin can be also used for the aforementioned first clad layer 30 and the aforementioned core layers 32.

The photocurable resin 34x contains a reactive functional group contributing to photocuring, and a reactive functional group contributing to thermal curing. Therefore, the photocurable resin 34x can be cured by the photocuring and the thermal curing.

Figure 10A:
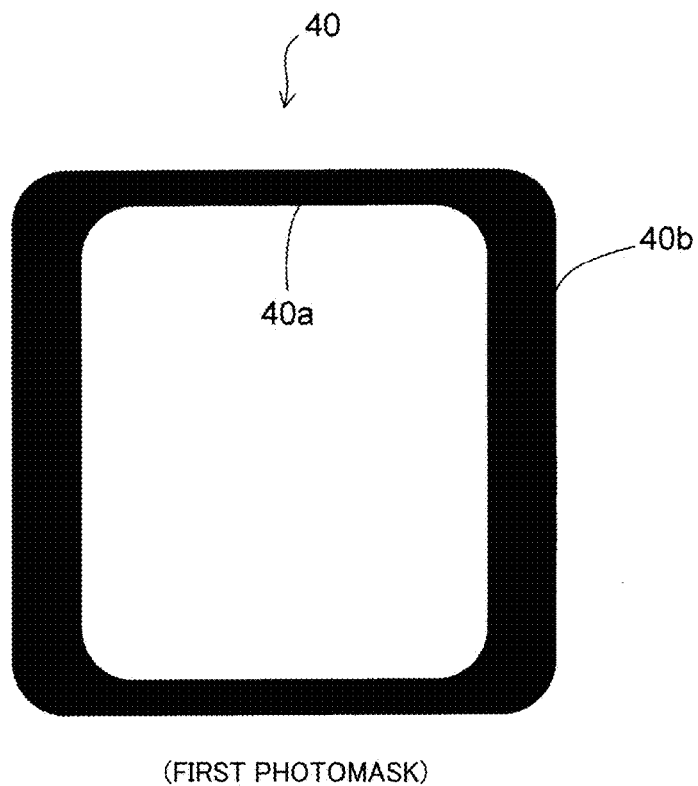
FIG. 10A is a plan view (Part 6) showing the method for manufacturing the optical waveguide apparatus according to the first embodiment.

A first photomask 40 used for primary light exposure of the photocurable resin 34x is shown in FIG. 10A. As shown in FIG. 10A, a light transmitting portion 40a is provided at a center portion of the first photomask 40, and a frame-like light shielding portion 40b is provided at an outer peripheral portion of the first photomask 40.

The aforementioned photocurable resin 34x of FIG. 9A is irradiated with ultraviolet light through the light transmitting portion 40a of the first photomask 40 of FIG. 10A. Accordingly, primary light exposure is performed on the photocurable resin 34x. In the primary light exposure, a light exposure amount is adjusted to thereby turn the photocurable resin 34x into a semi-cured state.

Figure 10B:
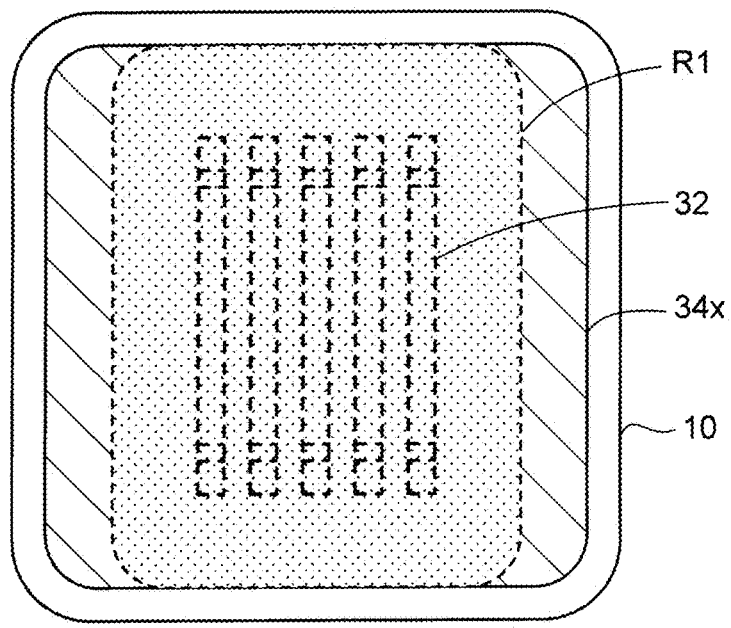
FIG. 10B is a sectional view (Part 6) showing the method for manufacturing the optical waveguide apparatus according to the first embodiment.

As shown in FIG. 10B, the primary light exposure is performed on a rectangular first region R1 of the photocurable resin 34x, which is defined by a broken line. The first region R1 is a region corresponding to an outer shape of a second clad layer which will be finally obtained.

For example, a time for the irradiation with the ultraviolet light is set to be shorter than a time required for full curing, or the ultraviolet light having lower intensity than intensity of the ultraviolet light used for the full curing is radiated.

Further, the photocurable resin 34x on which the primary light exposure has been performed is subjected to first heat treatment at a temperature of 100° C. to 150° C. In this manner, the primary light exposure and the first heat treatment are performed under conditions that the photocurable resin 34x can be in the semi-cured state. Thus, the first region R1 of the photocurable resin 34x is turned into the semi-cured state, as shown in FIG. 10B.

In FIG. 10B, in the photocurable resin 34x, the semi-cured first region R1 is indicated as a dot region, and an uncured region is indicated as a diagonally hatched region.

The term "semi-cured" represents a state in which crosslinking reaction has partially occurred in the photocurable resin 34x so that the entire photocurable resin 34x has not been completely cured. A crosslinking ratio (curing ratio) of the photocurable resin 34x to attain the semi-cured state is set at 10% to 80% (e.g. 50%) as high as a crosslinking ratio (curing ratio) of the "fully cured" one.

Figure 11A:
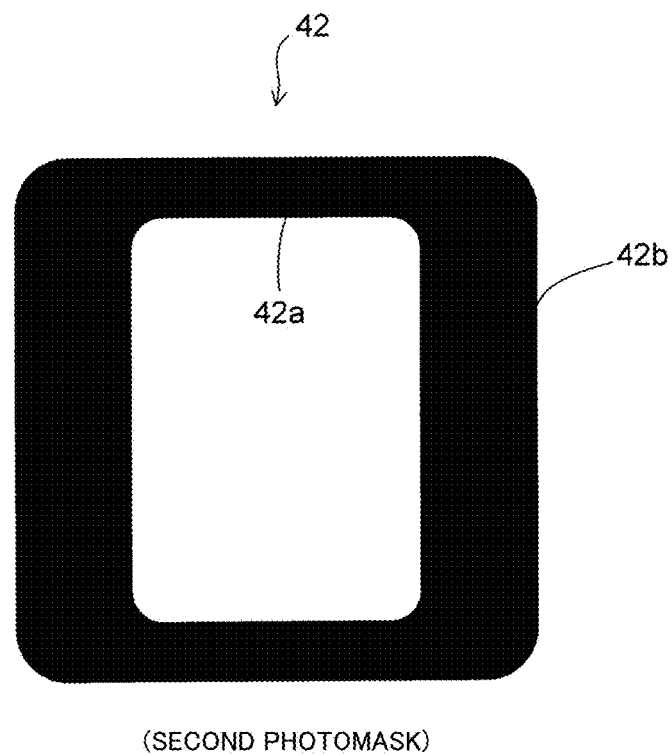
FIG. 11A is a plan view (Part 7) showing the method for manufacturing the optical waveguide apparatus according to the first embodiment.

Successively, as shown in FIG. 11A, a second photomask 42 used for secondary light exposure of the photocurable resin 34x is prepared. The second photomask 42 is provided with a light transmitting portion 42a for fully curing a center portion of the first region R1 of the photocurable resin 34x, and a light shielding portion 42b for maintaining an outer peripheral portion of the first region R1 of the photocurable resin 34x at the semi-cured state.

Therefore, the light transmitting portion 42a of the second photomask 42 is one size smaller than the light transmitting portion 40a of the first photomask 40.

The aforementioned photocurable resin 34x of FIG. 10B is irradiated with ultraviolet light through the light transmitting portion 42a of the second photomask 42 of FIG. 11A. Accordingly, secondary light exposure is performed on the photocurable resin 34x. In the secondary light exposure, a light exposure amount is adjusted to thereby fully cure a region of the photocurable resin 34x corresponding to the light transmitting portion 42a of the second photomask 42.

Specifically, light exposure conditions of the secondary light exposure are set to be the same as the aforementioned light exposure conditions of the primary light exposure.

Figure 11B:
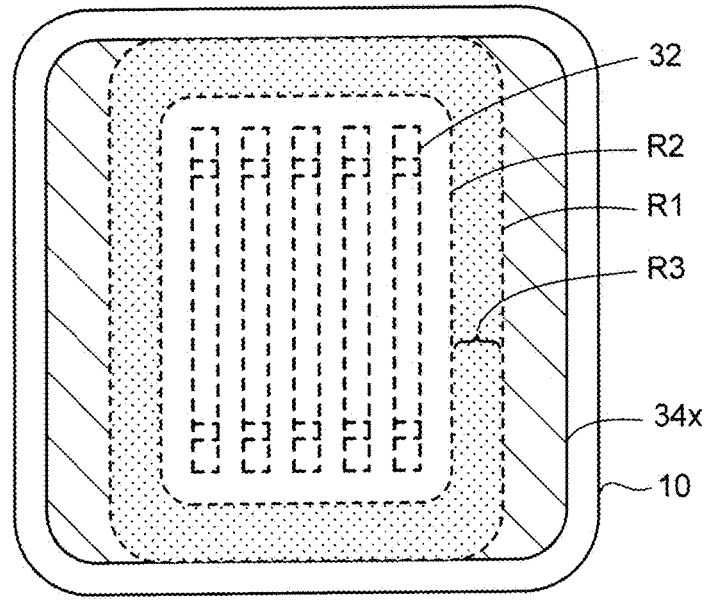
FIG. 11B is a sectional view (Part 7) showing the method for manufacturing the optical waveguide apparatus according to the first embodiment.

As shown in FIG. 11B, the secondary light exposure is performed on a second region R2 of the photocurable resin 34x, which is enclosed with a broken line. The second region R2 on which the secondary light exposure is performed is a region one size smaller than the semi-cured rectangular first region R1.

Further, the photocurable resin 34x on which the secondary light exposure has been performed is subjected to second heat treatment at a temperature of 100° C., to 150° C.

Thus, the second region R2 of the photocurable resin 34x is completely cured and turned into a fully cured state by total treatment including the primary light exposure with the first heat treatment and the secondary light exposure with the second heat treatment. In FIG. 11B, the fully cured second region R2 of the photocurable resin 34x is indicated as a white blank region.

On the other hand, a frame-like region R3 which is obtained by removing the second region R2 from the first region R1 of the photocurable resin 34x is however shielded against the secondary light exposure due to the light shielding portion 42b of the second photomask 42. Therefore, the frame-like region R3 is maintained at the semi-cured state. The semi-cured frame-like region R3 of the photocurable resin 34x is indicated as a dot region.

The frame-like region R3 of the photocurable resin 34x is a rectangular region corresponding to an outer peripheral portion of the second clad layer which will be finally obtained.

Then, the photocurable resin 34x of FIG. 11B which has been exposed to the light is processed by a developer so that, of the photocurable resin 34x, opposite end portions (diagonally hatched regions) which are unexposed to the light are dissolved and removed, as shown in FIG. 12.

Thus, the second clad layer 34 is formed on the first clad layer 30 to cover the core layers 32. An area of the second clad layer 34 is set to be smaller than an area of the first clad layer 30. In other words, the second clad layer 34 is formed on the first clad layer 30 so that a surface of the first clad layer 30 is partially exposed from the second clad layer 34.

The second clad layer 34 is formed to include a fully cured portion 34a and a semi-cured portion 34b. The fully cured portion 34a is disposed at a center portion of the second clad layer 34. The semi-cured portion 34b is disposed at an outer peripheral portion of the second clad layer 34. The semi-cured portion 34b is exposed in side surfaces of the second clad layer 34.

In this manner, the second clad layer 34 is formed so that the outer peripheral portion of the second clad layer 34 is constituted by the frame-like semi-cured portion 34b with which an outer periphery of the fully cured portion 34a is covered.

In the aforementioned manner, the optical waveguide apparatus 1 according to the first embodiment can be obtained, as shown in FIG. 12 and FIG. 13.

As shown in FIG. 13, the optical waveguide apparatus 1 according to the first embodiment is provided with the aforementioned wiring substrate 10 which has been described in FIGS. 5A and 5B. In the wiring substrate 10, the wiring layers 20 are formed on the opposite surfaces of the insulating substrate 12 respectively. The wiring layers 20 on the opposite surface sides are connected to each other through the through conductors 22.

The first clad layer 30 is formed on the wiring substrate 10. The entire first clad layer 30 is completely cured and fully cured. In addition, the core layers 32 are formed to be arranged side by side on the first clad layer 30.

Further, the groove portions 32a (FIG. 8B) provided with the slopes S are formed at the opposite end portions of each of the core layers 32. The optical path converting mirrors M (FIG. 8B) which are formed of the metal layers and each of which is configured to convert an optical path of light are formed on the slopes S of the groove portions 32a.

Further, the second clad layer 34 is formed on the first clad layer 30 and the core layers 32. The area of the second clad layer 34 is set to be smaller than the area of the first clad layer 30. Therefore, the side surfaces of the second clad layer 34 are disposed on an inner side than side surfaces of the first clad layer 30.

As shown in FIG. 12 and FIG. 13, the second clad layer 34 has the fully cured portion 34a, and the semi-cured portion 34b which is formed at the outer peripheral portion of the second clad layer 34. The second clad layer 34 includes the fully cured portion 34a which is formed at the center portion of the second clad layer 34, and the semi-cured portion 34b which is formed at the outer peripheral portion of the second clad layer 34.

The fully cured portion 34a and the semi-cured portion 34b in the second clad layer 34 are formed to be connected to each other integrally. All the core layers 32 are covered with the fully cured portion 34a of the second clad layer 34. An optical waveguide 5 is constructed from the first clad layer 30, the core layers 32 and the second clad layer 34. A refractive index of each of the core layers 32 is set to be higher than a refractive index of each of the first clad layer 32 and the second clad layer 34.

Thus, the second clad layer 34 whose center portion is formed of the fully cured portion 34a, and whose outer peripheral portion is formed of the semi-cured portion 34b is disposed on the first clad layer 30 which has been fully cured as a whole.

As described above in the aforementioned preliminary matter, when a TC test (Thermal Cycle test) is performed on the optical waveguide apparatus 1 shown in FIG. 13, stress is concentrated at contact portions between the side surfaces of the outer peripheral portion of the second clad layer 34 and the upper surface of the first clad layer 30. In the TC test, a thermal cycle test is performed, for example, in a temperature range of −55° C. to 125° C.

In the embodiment, the outer peripheral portion of the second clad layer 34 is the semi-cured portion 34b. Accordingly, the aforementioned stress can be dispersed by the semi-cured portion 34b of the second clad layer 34.

Accordingly, cracking can be prevented from occurring inside the first clad layer 30 from the contact portions of the first clad layer 30 with the side surfaces of the outer peripheral portion of the second clad layer 34. Thus, a manufacturing yield of the optical waveguide apparatus can be improved, and sufficient reliability can be obtained.

In addition, the fully cured portion 34a of the second clad layer 34 is disposed in the region where the core layers 32 are arranged and disposed side by side and where the optical waveguide 5 is constructed. All the core layers 32 are covered with the fully cured portion 34a of the second clad layer 34. Therefore, optical properties as excellent as those of a background-art structure can be obtained by the optical waveguide 5 according to the embodiment.

Incidentally, in order to form the second clad layer 34 having the fully cured portion 34a and the semi-cured portion 34b in the aforementioned manufacturing method according to the first embodiment, light exposure is performed twice using the first photomask 40 and the second photomask 42.

Besides this method, the second clad layer 34 having the fully cured portion 34a and the semi-cured portion 34b may be formed by light exposure performed once using one gray-tone mask as a photomask, as will be described in an undermentioned third embodiment.

In this case, the photocurable resin is irradiated with ultraviolet light through the gray-tone mask provided with a light transmitting portion and a light semi-transmitting portion. Accordingly, light exposure is performed on the photocurable resin. Thus, the fully cured portion 34a of the second clad layer 34 is obtained from one region of the photocurable resin corresponding to the light transmitting portion of the gray-tone mask. In addition, the semi-cured portion 34b of the second clad layer 34 is obtained from the other region of the photocurable resin corresponding to the light semi-transmitting portion of the gray-tone mask.

Modification of First Embodiment

Figure 16:
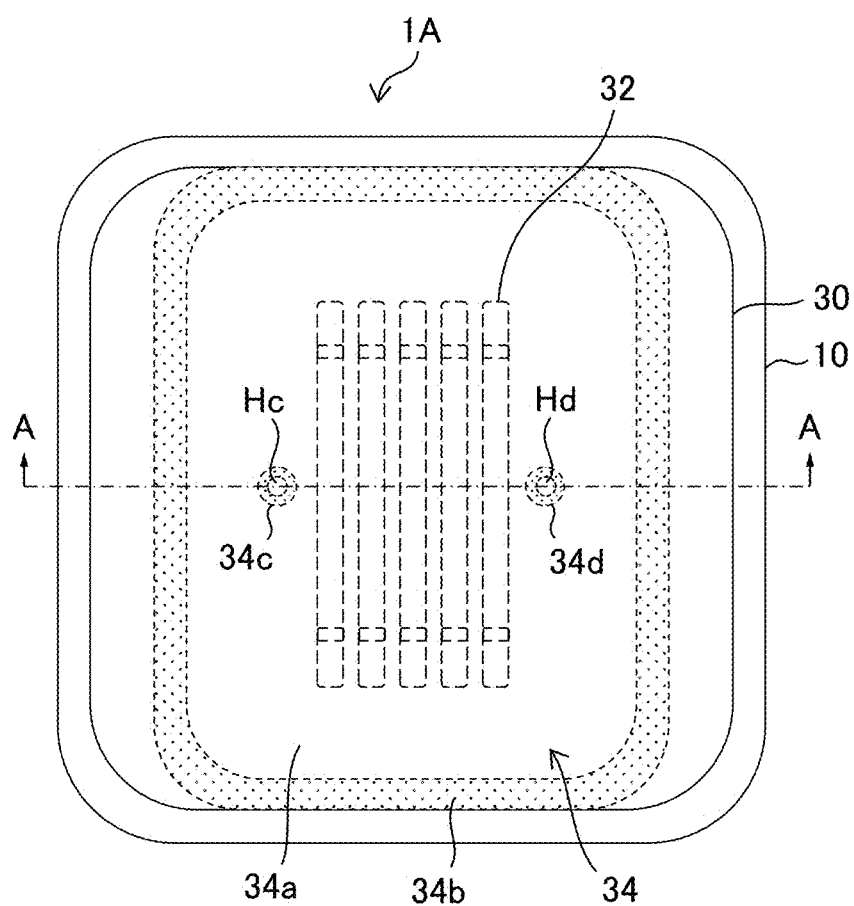
FIG. 16 is a plan view (Part 3) showing the optical waveguide apparatus according to the modification of the first embodiment.
Figure 17:
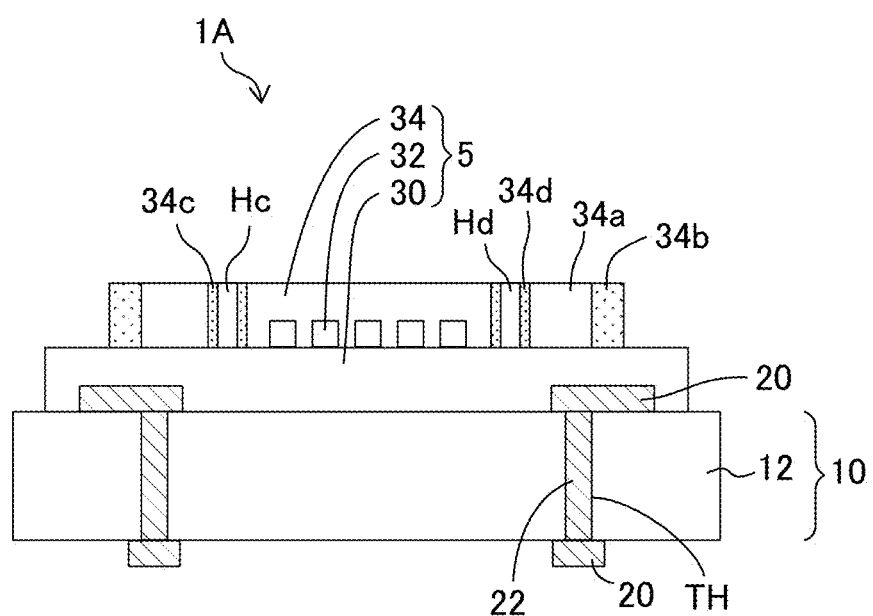
FIG. 17 is a sectional view taken along a line A-A shown in FIG. 16 to show the optical waveguide apparatus according to the modification of the first embodiment.

Next, an optical waveguide apparatus 1A according to a modification of the first embodiment will be described below with reference to FIGS. 14A to 17. As shown in FIG. 17, the optical waveguide apparatus 1A according to the modification of the first embodiment is different from the optical waveguide apparatus 1 according to the first embodiment in that two through holes Hc and Hd are formed in a second clad layer 34, and semi-cured portions 34c and 34d are formed in the second clad layer 34 to surround the through holes Hc and Hd. In addition, a method for manufacturing the optical waveguide apparatus 1A according to the modification is different from the method for manufacturing the optical waveguide apparatus 1 according to the first embodiment in that a first photomask 140 and a second photomask 142 are used in place of the first photomask 40 and the second photomask 42. That is, by use of the first photomask 140 and the second photomask 142, not only the two through holes Hc and Hd but also the semi-cured portions 34c and 34d are formed in the second clad layer 34 of the optical waveguide apparatus 1A. First, the method for manufacturing the optical waveguide apparatus 1A will be described briefly with reference to FIGS. 14A to 15B.

Figure 14A:
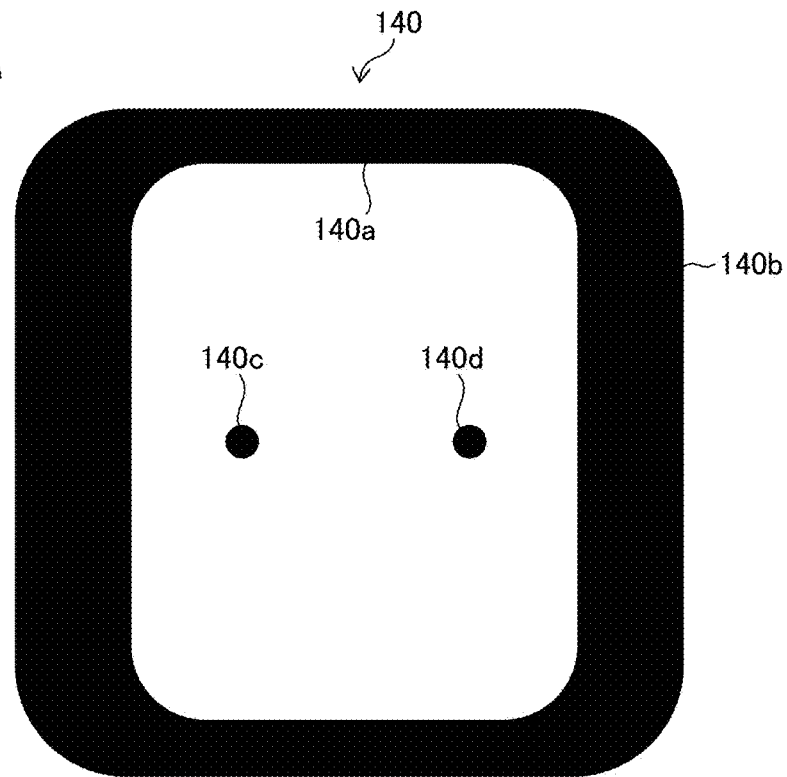
FIGS. 14A and 14B are plan views (Part 1) showing a method for manufacturing an optical waveguide apparatus according to a modification of the first embodiment.
Figure 14B:
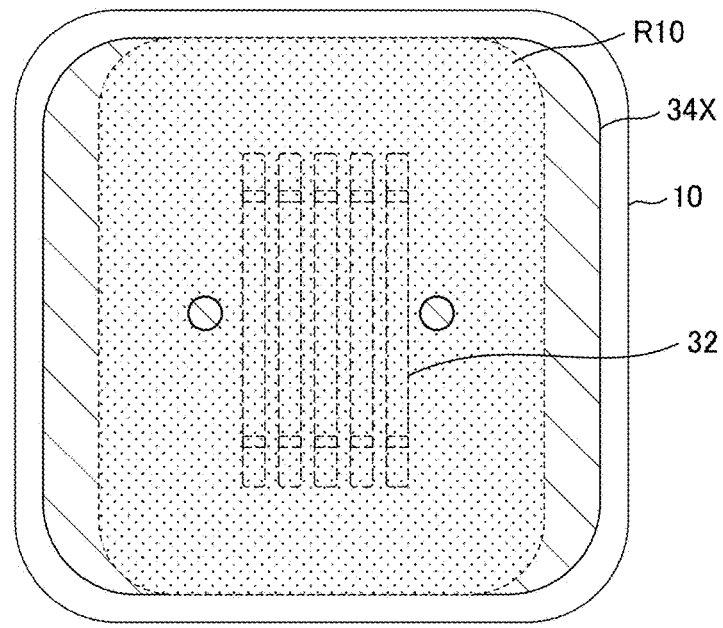

FIG. 14A shows the first photomask 140 used for primary light exposure of a photocurable resin 34x. As shown in FIG. 14A, the first photomask 140 has a light transmitting portion 140a, a frame-like light shielding portion 140b, and circular light shielding portions 140c and 140d. As shown in FIG. 14B, the photocurable resin 34x is irradiated with ultraviolet light through the first photomask 140 (primary light exposure step). In the primary light exposure step, a light exposure amount of the ultraviolet light is adjusted to thereby turn the photocurable resin 34x into a semi-cured state. For example, the light exposure amount of the ultraviolet light can be adjusted to thereby shorten an irradiation time for the irradiation with the ultraviolet light or reduce intensity of the ultraviolet light.

As shown in FIG. 14B, the photocurable resin 34x is irradiated with the ultraviolet light in a region R10 corresponding to the light transmitting portion 140a of the first photomask 140. The region R10 is designated by a broken line. On this occasion, portions of the photocurable resin 34x corresponding to the circular light shielding portions 140c and 140d are however shielded against the irradiation with the ultraviolet light. Next, the photocurable resin 34x on which the primary light exposure has been performed is heated at a temperature of 100° C. to 150° C. so as to be turned into the semi-cured state. As shown in FIG. 14B, a dot-hatched portion of the photocurable resin 34x is in the semi-cured state while diagonally hatched portions of the photocurable resin 34x (particularly the portions of the photocurable resin 34x corresponding to the light shielding portions 140c and 140d) are in an uncured state.

Figure 15A:
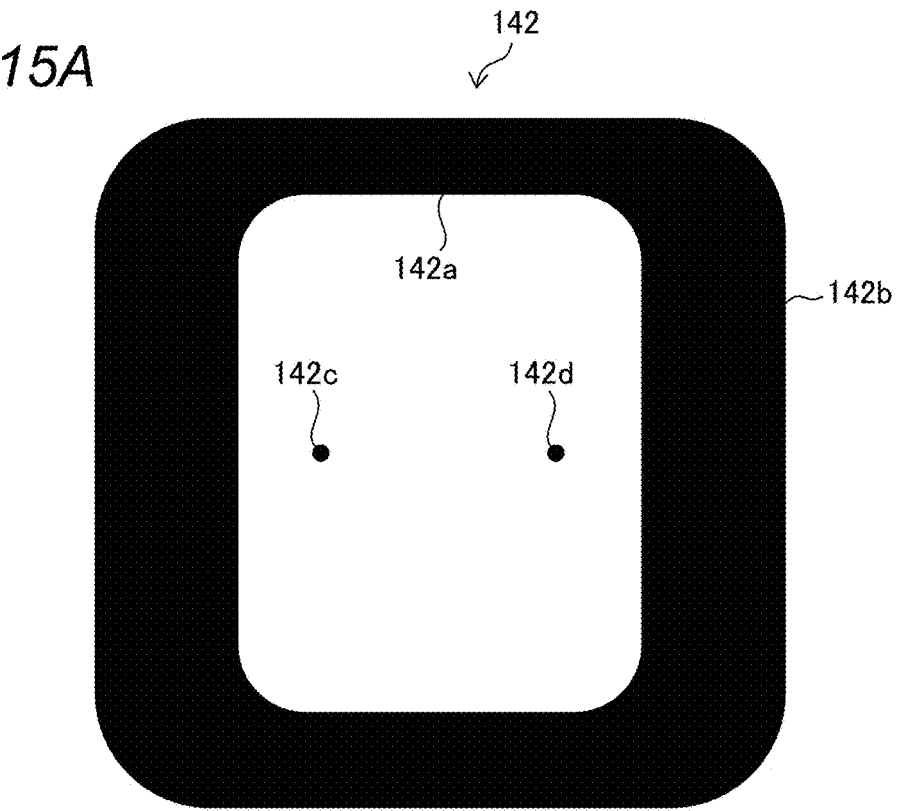
FIGS. 15A and 15B are plan views (Part 2) showing the method for manufacturing the optical waveguide apparatus according to the modification of the first embodiment.

Next, as shown in FIG. 15A, the second photomask 142 used for secondary light exposure of the photocurable resin 34x is prepared. The second photomask 142 has a light transmitting portion 142a, a frame-like light shielding portion 142b, and circular light shielding portions 142c and 142d. An area of the light transmitting portion 142a is smaller than an area of the light transmitting portion 140a of the first photomask 140. Further, the center of the light shielding portion 142c is coincident with the center of the light shielding portion 140c of the first photomask 140, and an outer diameter of the light shielding portion 142c is smaller than an outer diameter of the light shielding portion 140c. Moreover, the center of the light shielding portion 142d is coincident with the center of the light shielding portion 140d of the first photomask 140, and an outer diameter of the light shielding portion 142d is smaller than an outer diameter of the light shielding portion 140d.

Figure 15B:
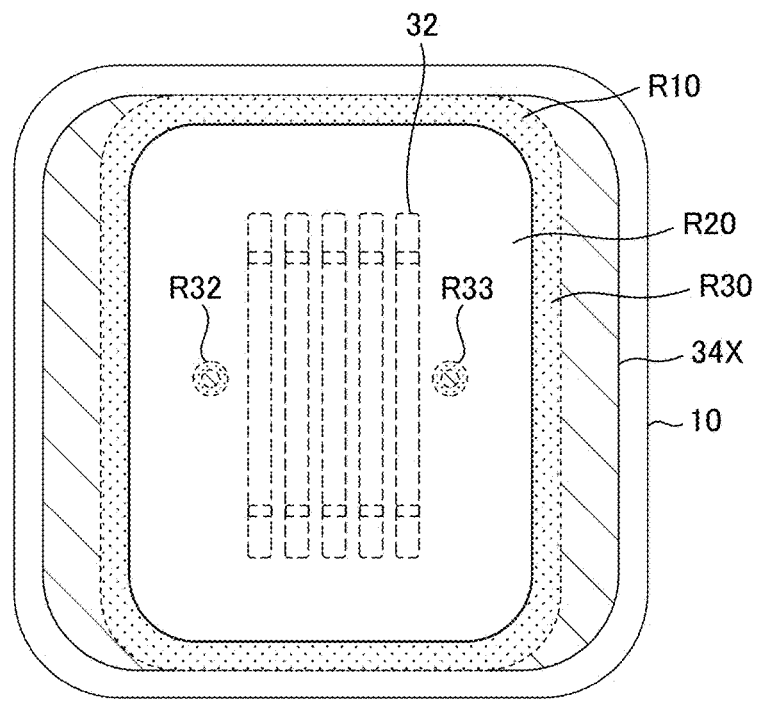

As shown in FIG. 15B, the photocurable resin 34x is irradiated with ultraviolet light through the second photomask 142 (secondary light exposure step). In the secondary light exposure step, a light exposure amount of the ultraviolet light is adjusted suitably to thereby completely cure the photocurable resin 34x.

The photocurable resin 34x is irradiated with the ultraviolet light in a region R20 corresponding to the light transmitting portion 142a of the second photomask 142. On this occasion, portions of the photocurable resin 34x corresponding to the circular light shielding portions 142c and 142d are however shielded against the irradiation with the ultraviolet light.

Next, the photocurable resin 34x on which the secondary light exposure has been performed is heated at a temperature of 100° C. to 150° C. to be turned into a fully cured state. As shown in FIG. 15B, a white blank portion of the photocurable resin 34x is in the fully cured state. In addition, a dot-hatched portion of the photocurable resin 34x is in a semi-cured state. Particularly, in a frame-like region R30 which is surrounded by the region R10 and the region R20, the photocurable resin 34x is in the semi-cured state. Further, at ring-like regions R32 and R33, the photocurable resin 34x is in the semi-cured state. Further, diagonally hatched portions of the photocurable resin 34x are in an uncured state.

Then, the photocurable resin 34x is developed by a developer so that the uncured portions of the photocurable resin 34x (i.e. the diagonally hatched portions of the photocurable resin 34x) are removed. Thus, the optical waveguide apparatus 1A can be obtained, as shown in FIG. 16 and FIG. 17. Differently from the optical waveguide apparatus 1 according to the first embodiment, the two through holes Hc and Hd are formed in the second clad layer 34 of the optical waveguide apparatus 1A, as shown in FIG. 16 and FIG. 17. Further, the second clad layer 34 has a fully cured portion 34a, a semi-cured portion 34b disposed at an outer peripheral portion of the second clad layer 34, the ring-like semi-cured portion 34c surrounding the through hole Hc, and the ring-like semi-cured portion 34d surrounding the through hole Hd.

Thus, according to the optical waveguide apparatus 1A according to the modification, stress generated between the outer peripheral portion of the second clad layer 34 and an upper surface of a first dad layer 30 can be dispersed by the semi-cured portion 34b. Further, stress generated between the portion of the second dad layer 34 surrounding the through hole Hc and the upper surface of the first clad layer 30 can be dispersed by the semi-cured portion 34c. Moreover, stress generated between the portion of the second clad layer 34 surrounding the through hole Hd and the upper surface of the first clad layer 30 can be dispersed by the semi-cured portion 34d. In this manner, the semi-cured portions 34b to 34d are formed in the second clad layer 34. As a result, a manufacturing yield of the optical waveguide apparatus 1A can be improved, and reliability of the optical waveguide apparatus 1A can be improved. Incidentally, the shape of each of the through holes Hc and Hd in top view is circular in the modification. However, the shape of the through hole Hc, Hd in top view is not limited particularly. The shape of each of the light shielding portions 140c and 140d formed in the first photomask 140, and the shape of each of the light shielding portions 142c and 142d formed in the second photomask 142 can be changed suitably in accordance with the shape of the through hole Hc, Hd in top view.

Second Embodiment

Figure 24:
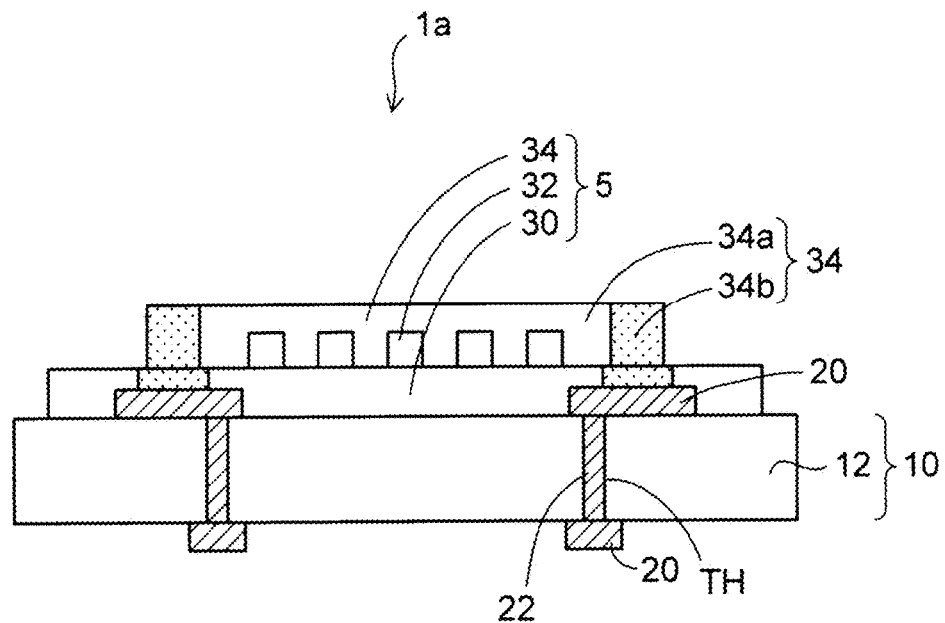
FIG. 24 is a sectional view showing the optical waveguide apparatus according to the second embodiment.
Figure 25:
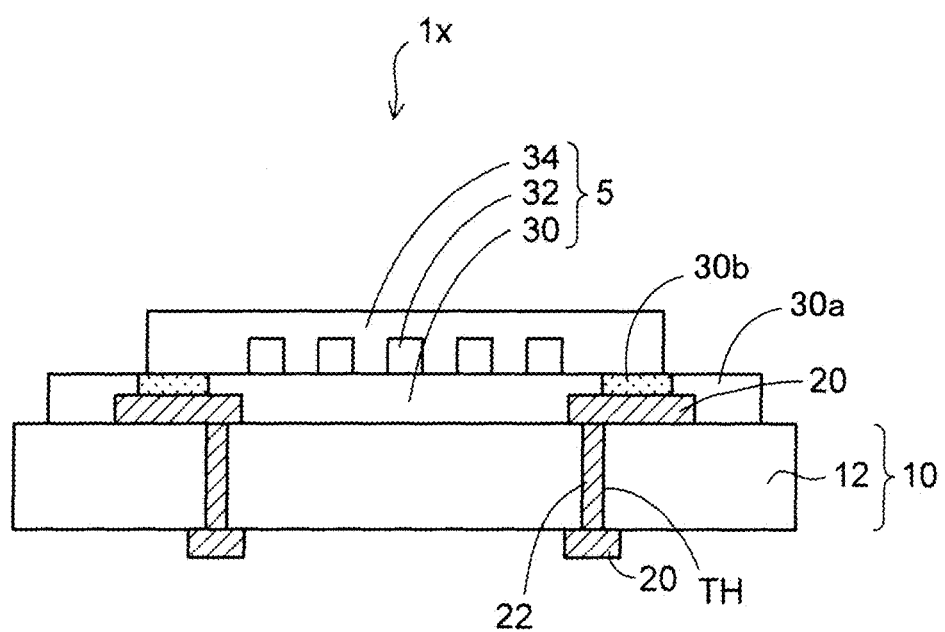
FIG. 25 is a sectional view showing an optical waveguide apparatus according to a modification of the second embodiment.

FIG. 18A to FIG. 23B are sectional views showing a method for manufacturing an optical waveguide apparatus according to a second embodiment. FIG. 24 and FIG. 25 are sectional views showing the optical waveguide apparatus according to the second embodiment.

The second embodiment has a configuration in which a semi-cured portion is also formed at a portion of a first clad layer corresponding to a semi-cured portion of a second clad layer, and the semi-cured portion of the second clad layer is disposed on the semi-cured portion of the first clad layer.

In the second embodiment, detailed description about the same steps and the same constituent elements as those in the first embodiment will be omitted.

Figure 18A:
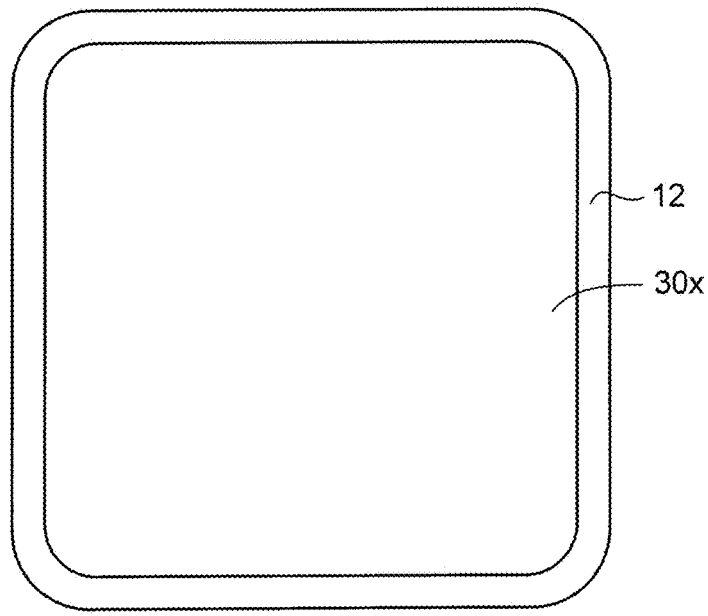
FIG. 18A is a plan view (Part 1) showing a method for manufacturing an optical waveguide apparatus according to a second embodiment.
Figure 18B:
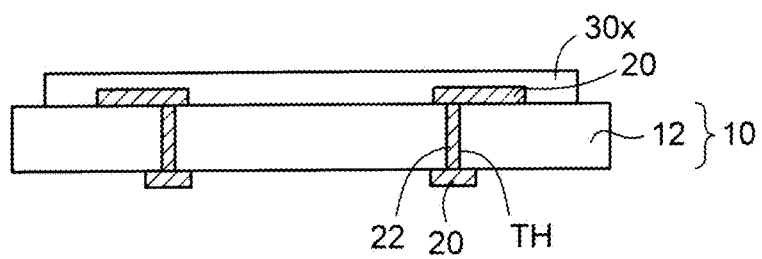
FIG. 18B is a sectional view (Part 1) showing a method for manufacturing an optical waveguide apparatus according to a second embodiment.

As shown in FIGS. 18A and 18B, in the method for manufacturing the optical waveguide apparatus according to the second embodiment, a g substrate 10 which is similar to or the same as the aforementioned wiring substrate 10 in FIGS. 5A and 5B according to the first embodiment is prepared. A first photocurable resin 30x which is uncured without being subjected to irradiation with ultraviolet light and heat treatment is formed on the wiring substrate 10. The first photocurable resin 30x may be formed as a resin sheet or as a coating of a liquid resin.

Figure 19A:
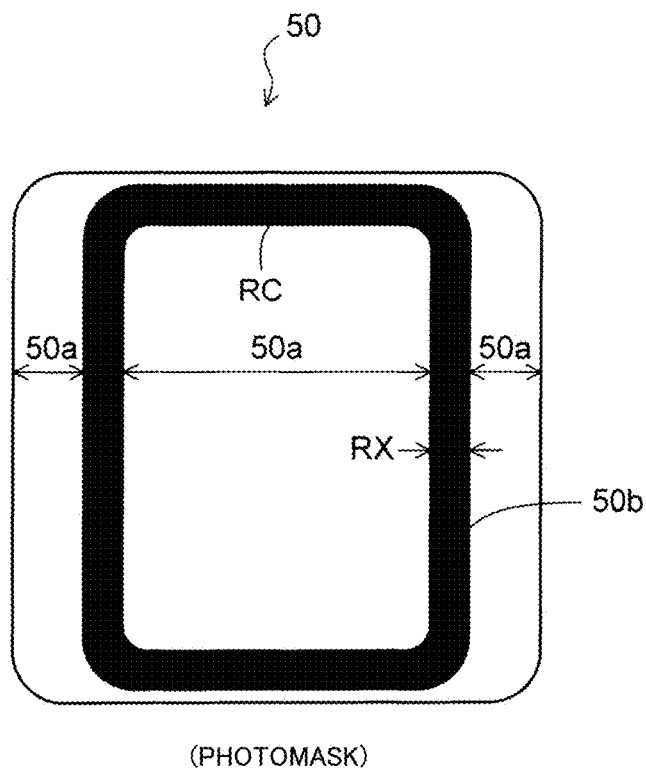
FIGS. 19A and 19B are plan views (Part 2) showing the method for manufacturing the optical waveguide apparatus according to the second embodiment.

As shown in FIG. 19A, a photomask 50 used for primary light exposure of the first photocurable resin 30x is prepared. In the photomask 50, a center portion and an outer peripheral portion are light transmitting portions 50a, and a frame-like region between the center portion and the outer peripheral portion is a light shielding portion 50b.

The aforementioned first photocurable resin 30x of FIG. 18A is irradiated with ultraviolet light through the light transmitting portions 50a of the photomask 50. Accordingly, primary light exposure is performed on the first photocurable resin 30x. On this occasion, light exposure conditions are adjusted to thereby turn the light-exposed regions of the first photocurable resin 30x into a semi-cured state.

Further, the first photocurable sin 30x on which the primary light exposure has been performed is subjected to first heat treatment at a temperature of 100° C. to 150° C. Thus, the primary light exposure and the first heat treatment are performed on conditions that the first photocurable resin 30x can be in the semi-cured state. As a result, a center portion and an outer peripheral portion of the first photocurable resin 30x are turned into the semi-cured state (dot regions), as shown in FIG. 19B.

On the other hand, a frame-like region of the first photocurable resin 30x which has been shielded from the light due to the light shielding portion 50b of the photomask 50 is left uncured (diagonally hatched region).

Figure 19B:
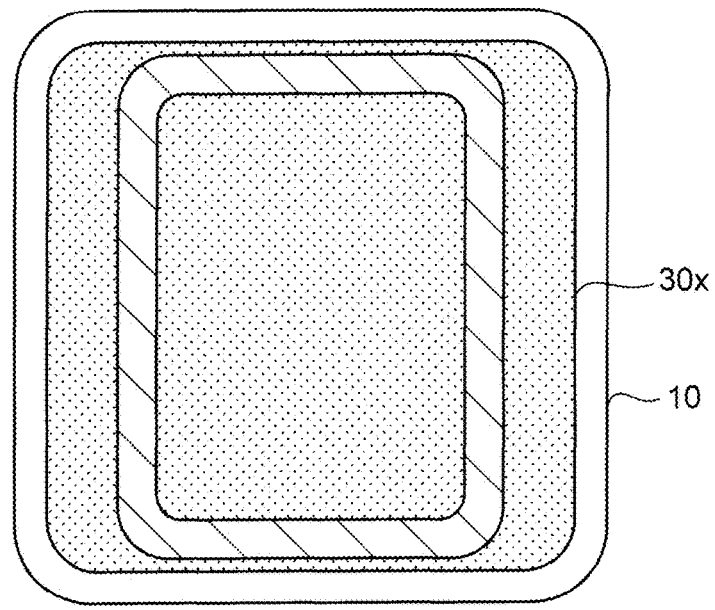
Figure 20A:
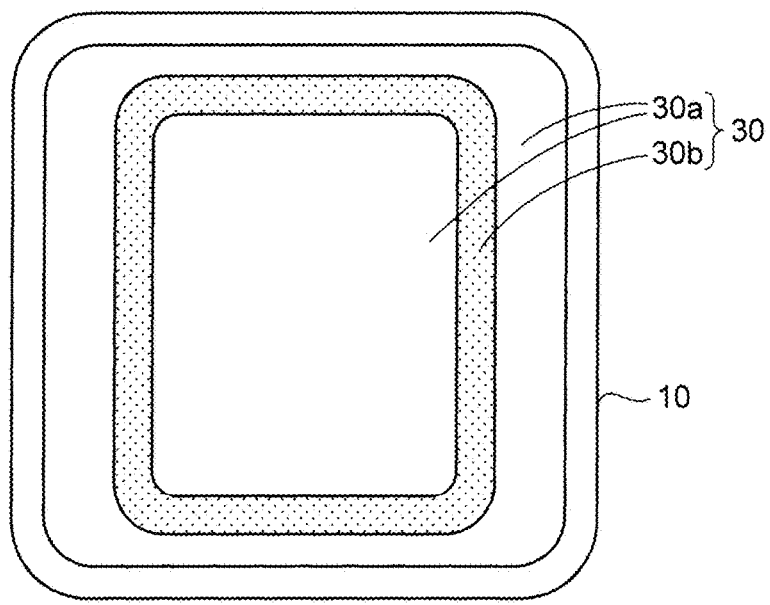
FIG. 20A is a plan view (Part 3) showing the method for manufacturing the optical waveguide apparatus according to the second embodiment.
Figure 20B:
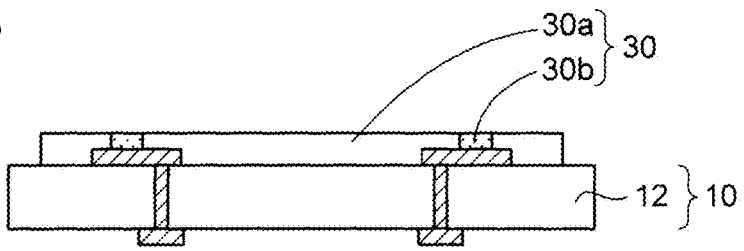
FIG. 20B is a sectional view (Part 3) showing the method for manufacturing the optical waveguide apparatus according to the second embodiment.

Next, the entire first photocurable resin 30x of FIG. 19B is irradiated with ultraviolet light without using a photomask, so that secondary light exposure (whole surface light exposure) is performed on the first photocurable resin 30x, as shown in FIGS. 20A and 20B.

Further, the first photocurable resin 30x on which the secondary light exposure has been performed is subjected to second heat treatment at a temperature of 100° C. to 150° C.

On this occasion, light exposure conditions and heating conditions are adjusted to thereby turn the center portion and the outer peripheral portion of the first photocurable resin 30x into a fully cured state by total treatment including the primary light exposure with the first heat treatment and the secondary light exposure with the second heat treatment.

In addition, on this occasion, the conditions of the secondary light exposure and the second heat treatment are adjusted to thereby turn the uncured frame-like region of the first photocurable resin 30x of FIG. 19B into a semi-cured state.

Thus, a first clad layer 30 is formed. A center portion and an outer peripheral portion of the first clad layer 30 are completely cured and formed into fully cured portions 30a (white blank regions). In addition, a frame-like region between the center portion and the outer peripheral portion of the first clad layer 30 is formed into a semi-cured portion 30b (dot region).

The frame-like region of the first clad layer 30 according to the second embodiment is a rectangular ring-like region disposed in an inner portion of the first clad layer 30 shaped like a rectangle.

In this manner, the first clad layer 30 having the fully cured portions 30a and the semi-cured portion 30b which is disposed in the frame-like region in plan view is formed.

Incidentally, the first clad layer 30 including the fully cured portions 30a and the semi-cured portion 30b may be formed by light exposure performed once using a gray-tone mask provided with light transmitting portions and a light semi-transmitting portion as in a manufacturing method according to the undermentioned third embodiment.

Figure 21A:
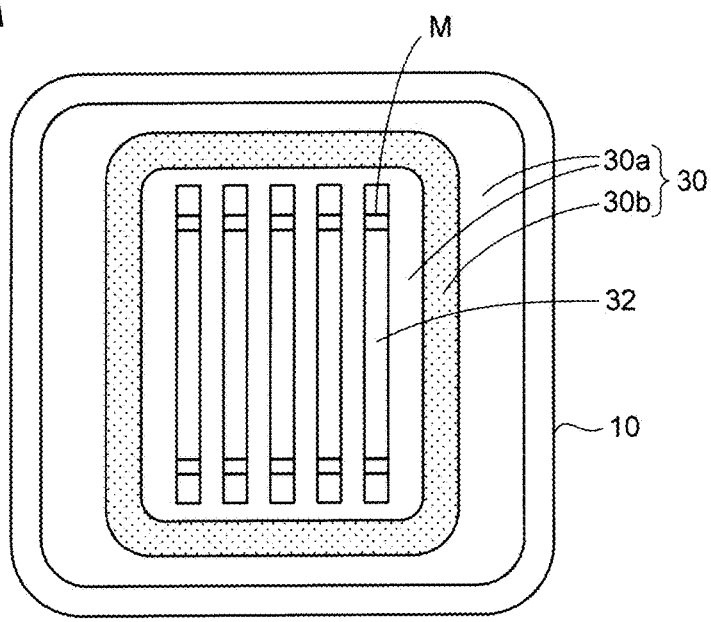
FIG. 21A is a plan view (Part 4) showing the method for manufacturing the optical waveguide apparatus according to the second embodiment.
Figure 21B:
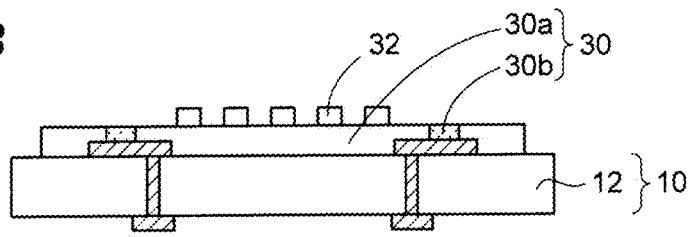
FIG. 21B a sectional view (Part 4) showing the method for manufacturing the optical waveguide apparatus according to the second embodiment.

Next, as shown in FIGS. 21A and 21B, core layers 32 are formed on the first clad layer 30 by a method similar to or the same as the aforementioned step of FIGS. 7A and 7B in the first embodiment. Further, as shown in FIG. 21A, optical path converting mirrors M are formed on opposite end portions of each of the core layers 32 by a method similar to or the same as the aforementioned step of FIGS. 8A and 8B.

Figure 22A:
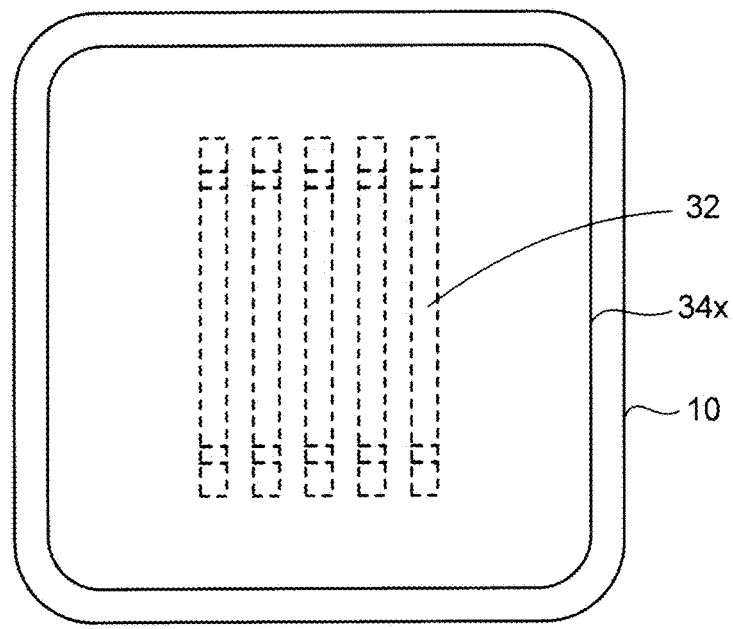
FIG. 22A is a plan view (Part 5) showing the method for manufacturing the optical waveguide apparatus according to the second embodiment.
Figure 22B:
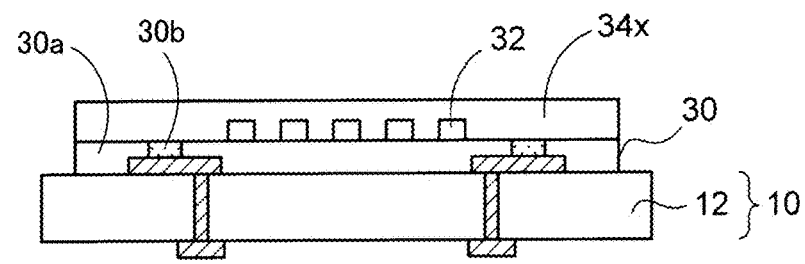
FIG. 22B is a sectional view (Part 5) showing the method for manufacturing the optical waveguide apparatus according to the second embodiment.

Then, as shown in FIGS. 22A and 22B, an uncured photocurable resin 34x is formed on the first clad layer 30 and the core layers 32. The photocurable resin 34x may be formed as a resin sheet or as a coating of a liquid resin.

Further, primary light exposure and first heat treatment are performed on a first region R1 of the photocurable resin 34x of FIG. 22A through a first photomask 40 in a manner similar to or the same as the aforementioned step of FIGS. 10A and 10B in the first embodiment.

Further, secondary light exposure and second heat treatment are performed on a second region R2 of the photocurable resin 34x through a second photomask 42 in a manner similar to or the same as the aforementioned step of FIGS. 11A and 11B in the first embodiment.

Figure 23A:
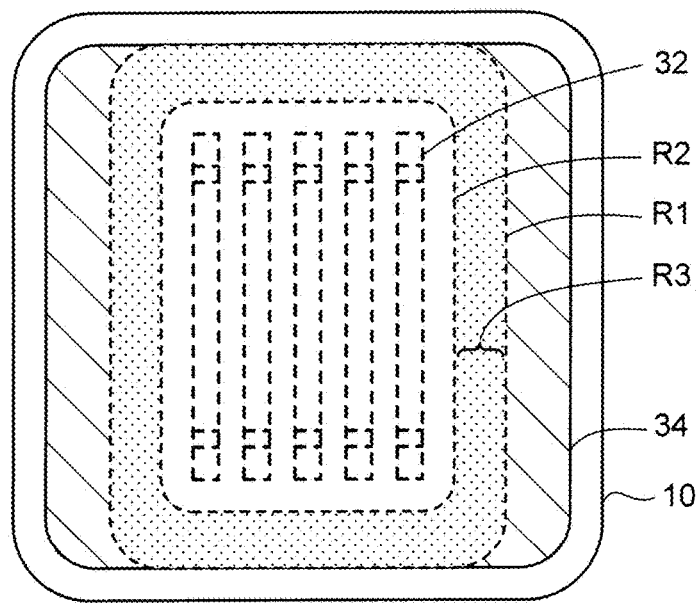
FIGS. 23A and 23B are plan views (Part 6) showing the method for manufacturing the optical waveguide apparatus according to the second embodiment.

Thus, as shown in FIG. 23A, of the photocurable resin 34x, the second region R2 which is enclosed with a broken line is completely cured and turned into a fully cured state (white blank region) in a manner similar to or the same as in the aforementioned FIG. 11B in the first embodiment.

On the other hand, a frame-like region R3 which is obtained by removing the second region R2 from the first region R1 of the photocurable resin 34x is however shielded against the secondary light exposure due to a light shielding portion 42b of the second photomask 42. Therefore, the frame-like region R3 is maintained at the semi-cured state (dot region).

Figure 23B:
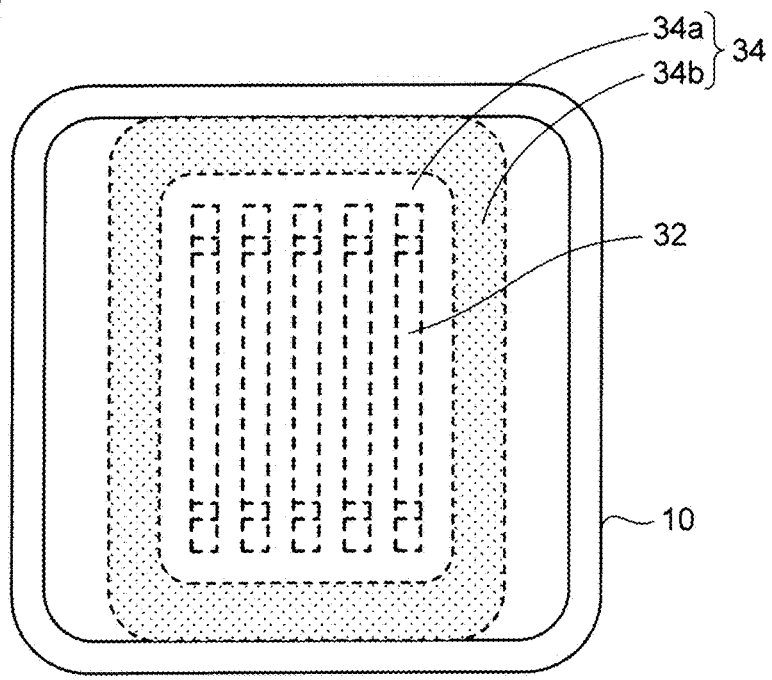

Then, the photocurable resin 34x shown in FIG. 23A is processed by a developer so that, of the photocurable resin 34x, opposite end portions (diagonally hatched regions) which are unexposed to the light are dissolved and removed, as shown in FIG. 23B.

Thus, a second clad layer 34 is formed to have a fully cured portion 34a provided at a center portion of the second clad layer 34, and a semi-cured portion 34b provided at an outer peripheral portion of the second clad layer 34, in a manner similar to or the same as in the aforementioned FIG. 12 in the first embodiment. The semi-cured portion 34b of the second clad layer 34 is disposed at a position corresponding to the frame-like semi-cured portion 30b of the first clad layer 30.

Incidentally, also in order to form the second clad layer 34, the fully cured portion 34a and the semi-cured portion 34b may be formed by light exposure performed once using a gray-tone mask provided with a light transmitting portion and a light semi-transmitting portion as in the manufacturing method according to the undermentioned third embodiment.

In the aforementioned manner, the optical waveguide apparatus 1a according to the second embodiment can be obtained, as shown in FIG. 24.

As shown in FIG. 24, the optical waveguide apparatus 1a according to the second embodiment is different from the aforementioned optical waveguide apparatus 1 according to the first embodiment in that the frame-like semi-cured portion 30b is also formed in the region of the first clad layer 30 corresponding to the semi-cured portion 34b formed in the outer peripheral portion of the second clad layer 34. Other constituent elements than the first clad layer 30 are the same as those in the optical waveguide apparatus 1 according to the first embodiment.

When the first clad layer 30 is seen in plan view with reference to the aforementioned FIGS. 20A and 20B, the center portion and the outer peripheral portion are formed into the fully cured portions 30a, and the frame-like region between the center portion and the outer peripheral portion is formed into the semi-cured portion 30b.

The semi-cured portion 34b of the second clad layer 34 is disposed on the frame-like semi-cured portion 30b of the first clad layer 30. The semi-cured portion 30b of the first clad layer 30 is set to be wider than the semi-cured portion 34b of the second clad layer 34.

Thus, the first clad layer 30 has the fully cured portions 30a and the frame-like semi-cured portion 30b. The outer peripheral portion of the second clad layer 34 is disposed on the semi-cured portion 30b of the first clad layer 30.

When a TC test (Thermal Cycle test) is also performed on the optical waveguide apparatus 1a of FIG. 24 according to the second embodiment, stress is concentrated at contact portions between side surfaces of the outer peripheral portion of the second clad layer 34 and an upper surface of the first clad layer 30.

In the second embodiment, the first clad layer 30 and the second clad layer 34 are disposed on each other in a state in which the upper surface of the frame-like semi-cured portion 30b of the first clad layer 30 contacts a lower surface of the semi-cured portion 34b of the outer peripheral portion of the second clad layer 34. In addition, the side surfaces of the semi-cured portion 34b of the outer peripheral portion of the second clad portion 34 are disposed on the upper surface of the semi-cured portion 30b of the first clad layer 30.

Thus, the aforementioned stress can be dispersed by the semi-cured portion 30b of the first clad layer 30 and the semi-cured portion 34b of the second clad layer 34. Consequently, cracking can be further prevented from occurring in the first clad layer 30 or the second clad layer 34 can be further prevented from being separated.

FIG. 25 is a view showing an optical waveguide apparatus according to a modification of the second embodiment. As shown in FIG. 25, the optical waveguide apparatus 1x according to the modification of the second embodiment is different from the optical waveguide apparatus 1a of FIG. 24 in that an entire second clad layer 34 is fully cured and a frame-like semi-cured portion 30b is formed only in a first clad layer 30.

Even when the entire second clad layer 34 is fully cured in the optical waveguide apparatus 1x according to the modification of the second embodiment, side surfaces of an outer peripheral portion of the second clad layer 34 are disposed on the semi-cured portion 30b of the first clad layer 30.

Accordingly, the aforementioned stress can be dispersed by the semi-cured portion 30b of the first clad layer 30 in a similar manner or the same manner. Consequently, cracking can be prevented from occurring in the first clad layer 30 or the second clad layer 34 can be prevented from being separated.

As described above, in the second embodiment, it is sufficient that at least the frame-like region of the first clad layer 30 on which the outer peripheral portion of the second clad layer 34 is disposed is the semi-cured portion 30b.

Third Embodiment

Figure 33:
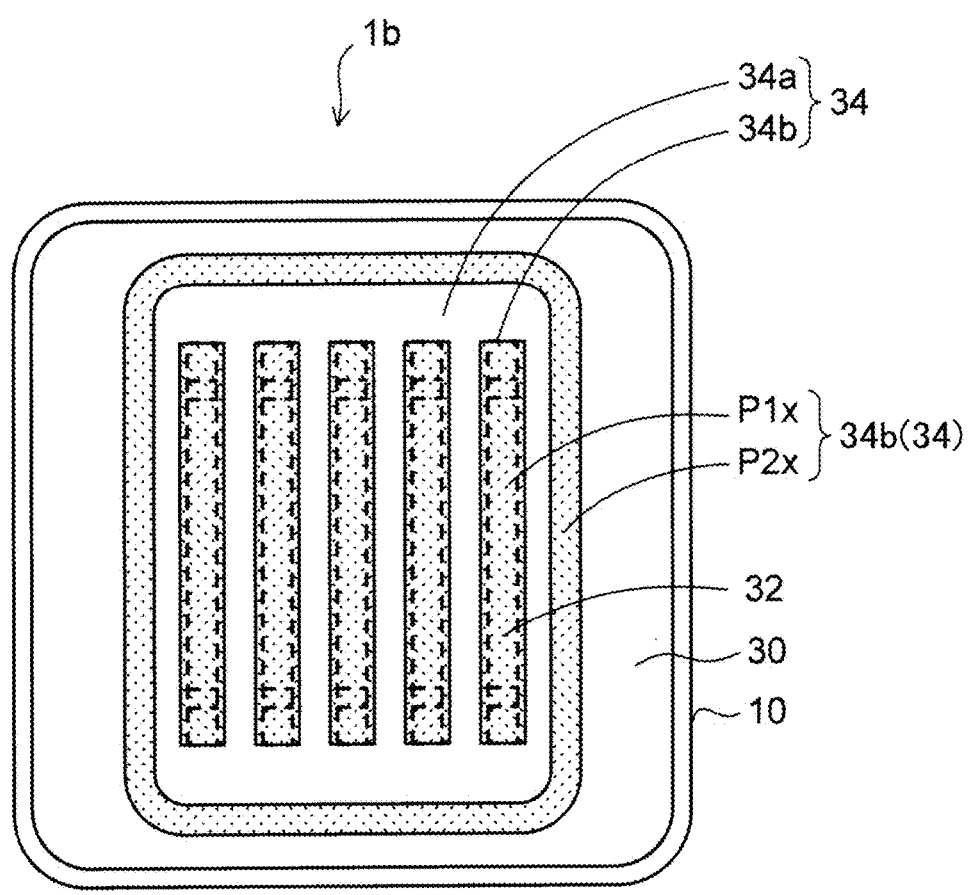
FIG. 33 is a plan view (Part 8) showing the method for manufacturing the optical waveguide apparatus according to the third embodiment.
Figure 34:
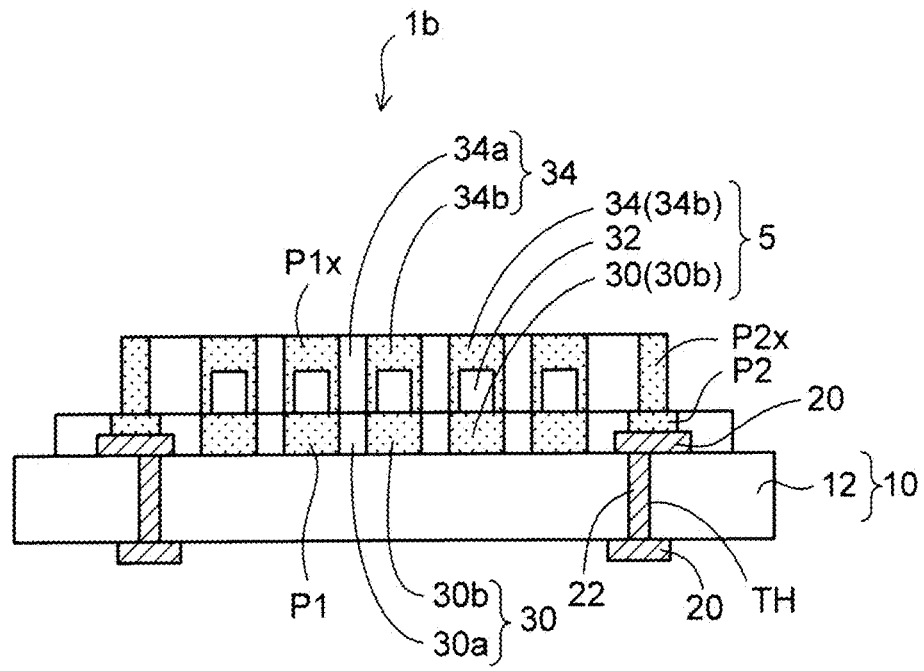
FIG. 34 is a sectional view showing the optical waveguide apparatus according to the third embodiment.

FIG. 26A to FIG. 32 are views showing a method for manufacturing an optical waveguide apparatus according to the third embodiment. FIG. 33 and FIG. 34 are views showing the optical waveguide apparatus according to the third embodiment.

The optical waveguide apparatus according to the third embodiment is different from the aforementioned optical waveguide apparatus 1a of FIG. 24 according to the second embodiment in that semi-cured portions each shaped like a belt in plan view are divided and disposed in a first clad layer and a second clad layer correspondingly to core layers.

The core layers are disposed on the belt-like semi-cured portions of the first clad layer respectively. The core layers are covered with the semi-cured portions of the second clad layer respectively.

Figure 26A:
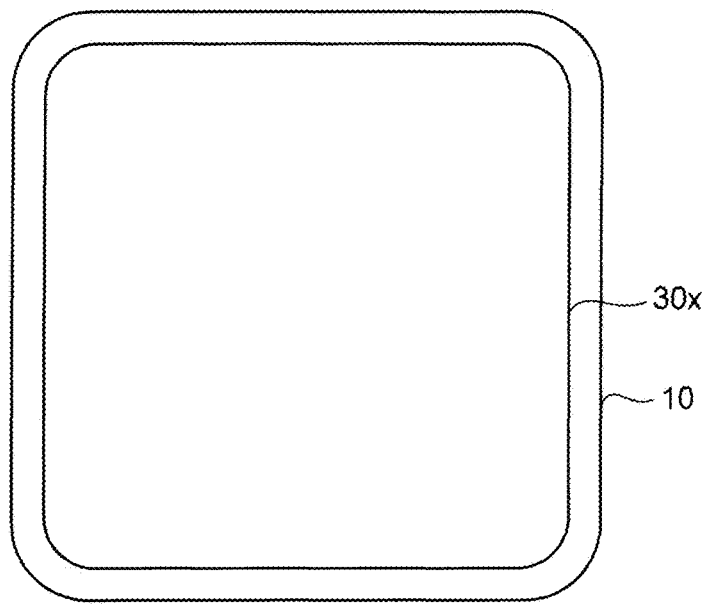
FIG. 26A is a plan view (Part 1) showing a method for manufacturing an optical waveguide apparatus according to a third embodiment.
Figure 26B:
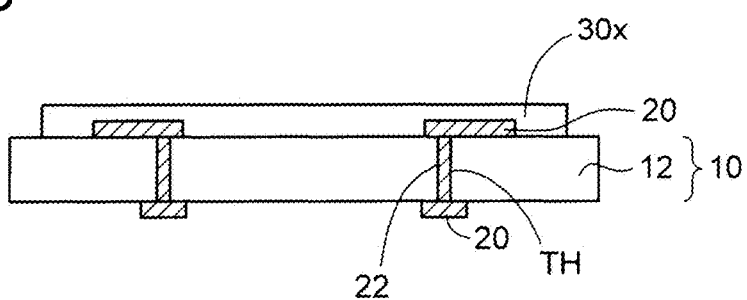
FIG. 26B is a sectional view (Part 1) showing a method for manufacturing an optical waveguide apparatus according to a third embodiment.

In the third embodiment, as shown in FIGS. 26A and 26B, a first photocurable resin 30x which is uncured without being subjected to irradiation with ultraviolet light and heat treatment is formed on a wiring substrate 10 in a manner similar to or the same as the aforementioned step of FIGS. 18A and 18B in the second embodiment.

Figure 27:
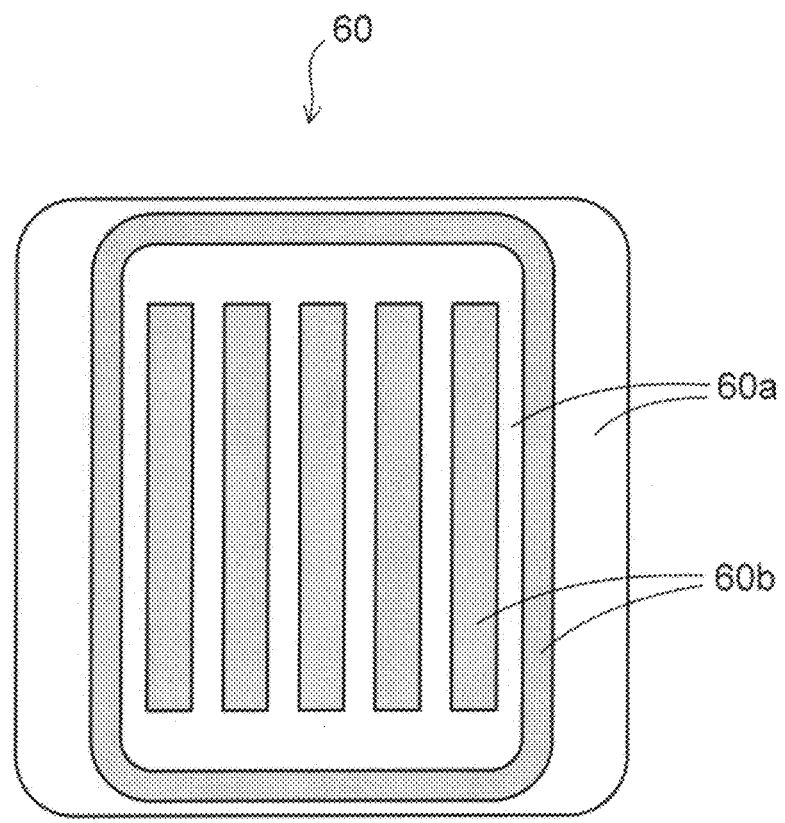
FIG. 27 is a plan view (Part 2) showing the method for manufacturing the optical waveguide apparatus according to the third embodiment.

As shown in FIG. 27, a first gray-tone mask 60 (photomask) used for light exposure of the first photocurable resin 30x is prepared. The first gray-tone mask 60 is provided with light transmitting portions 60a and light semi-transmitting portions 60b. Slits having a lower resolution than that of a light exposure apparatus are formed in the light semi-transmitting portions 60b. The slits shield light partially so that intermediate light exposure can be performed.

Thus, normal light exposure is performed by the light transmitting portions 60a. In addition, light exposure is suppressed by the light semi-transmitting portions 60b so that the intermediate light exposure with a smaller light exposure amount than that by the light transmitting portions 60a can be performed.

The first photocurable resin 30x of FIG. 26A is irradiated with ultraviolet light through the light transmitting portions 60a and the light semi-transmitting portions 60b of the first gray-tone mask 60 of FIG. 27. Further, the first photocurable resin 30x which has been exposed to the light is subjected to heat treatment at a temperature of 100° C. to 150° C.

On this occasion, light exposure conditions and heating conditions are adjusted so that regions of the first photocurable resin 30x corresponding to the light transmitting portions 60a of the first gray-tone mask 60 can be completely cured and fully cured. On this occasion, light exposure conditions and heating conditions are simultaneously adjusted so that regions of the first photocurable resin 30x corresponding to the light semi-transmitting portions 60b of the first gray-tone mask 60 can be turned into a semi-cured state.

Figure 28A:
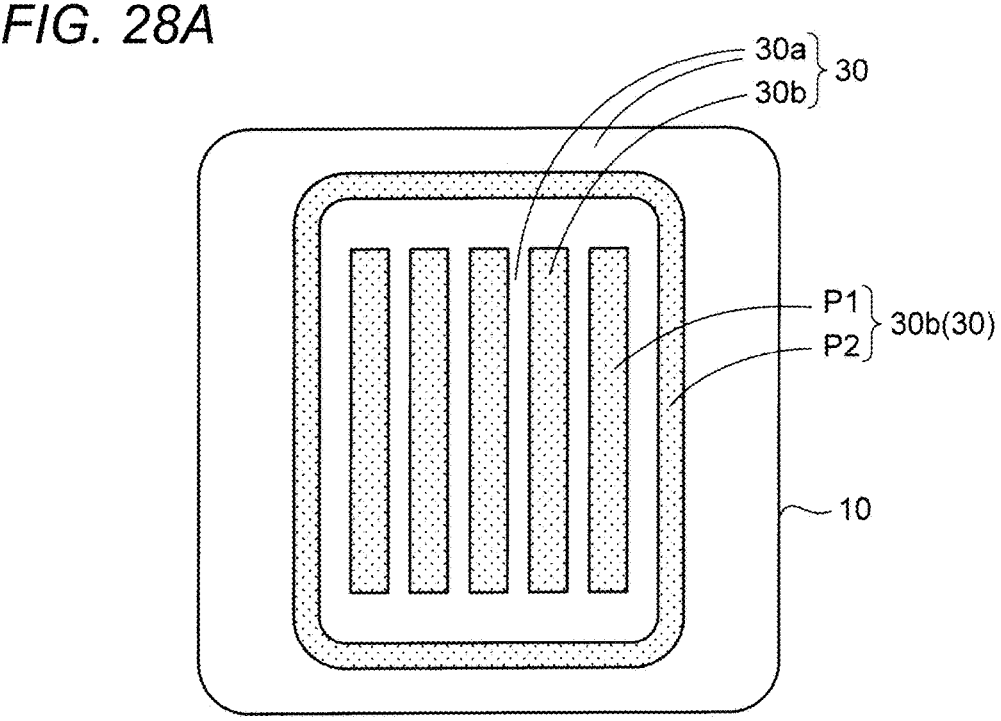
FIG. 28A is a plan view (Part 3) showing the method for manufacturing the optical waveguide apparatus according to the third embodiment.
Figure 28B:
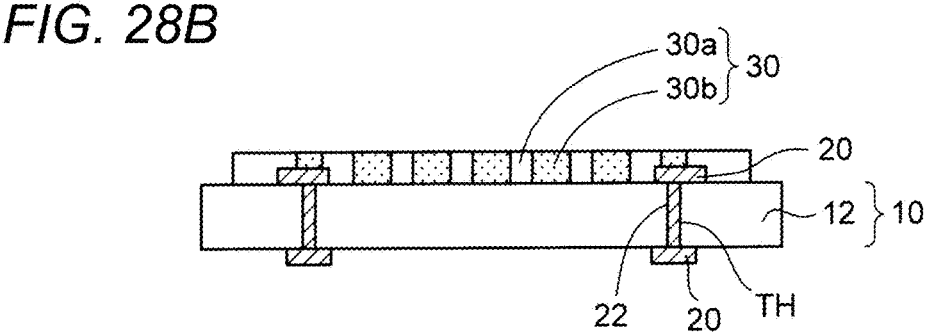
FIG. 28B is a sectional view (Part 3) showing the method for manufacturing the optical waveguide apparatus according to the third embodiment.

Thus, as shown in FIGS. 28A and 28B, the regions of the first photocurable resin 30x which have been exposed to the light through the light transmitting portions 60a of the first gray-tone mask 60 are completely cured and formed into fully cured portions 30a (white blank regions). Simultaneously, the regions of the first photocurable resin 30x which have been exposed to the light through the light semi-transmitting portions 60b of the first gray-tone mask 60 are formed into semi-cured portions 30b (dot regions).

Thus, the first photocurable resin 30x is exposed to the light by use of the first gray-tone mask 60, and subjected to heat treatment. Consequently, the fully cured portions 30a and the semi-cured portions 30b are formed simultaneously in the first photocurable resin 30x.

In this manner, a first clad layer 30 having the fully cured portions 30a and the semi-cured portions 30b is formed. The semi-cured portions 30b of the first clad layer 30 are formed to include belt-like patterns P1 corresponding to a plurality of core layers which will be formed in a next step.

In addition, the semi-cured portions 30b of the first clad layer 30 are formed to include a frame-like pattern P2, which is disposed to surround a rectangular region in which the plurality of core layers should be disposed.

The other regions than the semi-cured portions 30b of the first clad layer 30 are the fully cured portions 30a, The fully cured portions 30a are partially disposed between adjacent ones of the belt-like patterns P1 of the semi-cured portions 30b of the first clad layer 30. In addition, the fully cured portions 30a are partially disposed in the region between the belt-like patterns P1 and the frame-like pattern P2 of the semi-cured portions 30b of the first clad layer 30, and in the region surrounding the frame-like pattern P2.

The fully cured portions 30a and the semi-cured portions 30b in the first clad layer 30 are formed to be connected to one another integrally.

Incidentally, a halftone mask may be used in place of the first gray-tone mask 60. In the halftone mask, a semi-transmitting film is disposed in regions where intermediate light exposure should be performed.

In addition, instead of using the gray-tone mask, the first clad layer 30 having the fully cured portions 30a and the semi-cured portions 30b may be formed by light exposure performed twice as in the aforementioned manufacturing method according to the first embodiment.

In this case, first, the entire first photocurable resin 30x of FIG. 26A is exposed to light to be turned into a semi-cured state. Then, the first photocurable resin 30x is exposed to light through a photomask which includes light transmitting portions corresponding to the fully cured portions 30a and light shielding portions corresponding to the semi-cured portions 30b. Thus, the fully cured portions 30a are obtained.

Figure 29A:
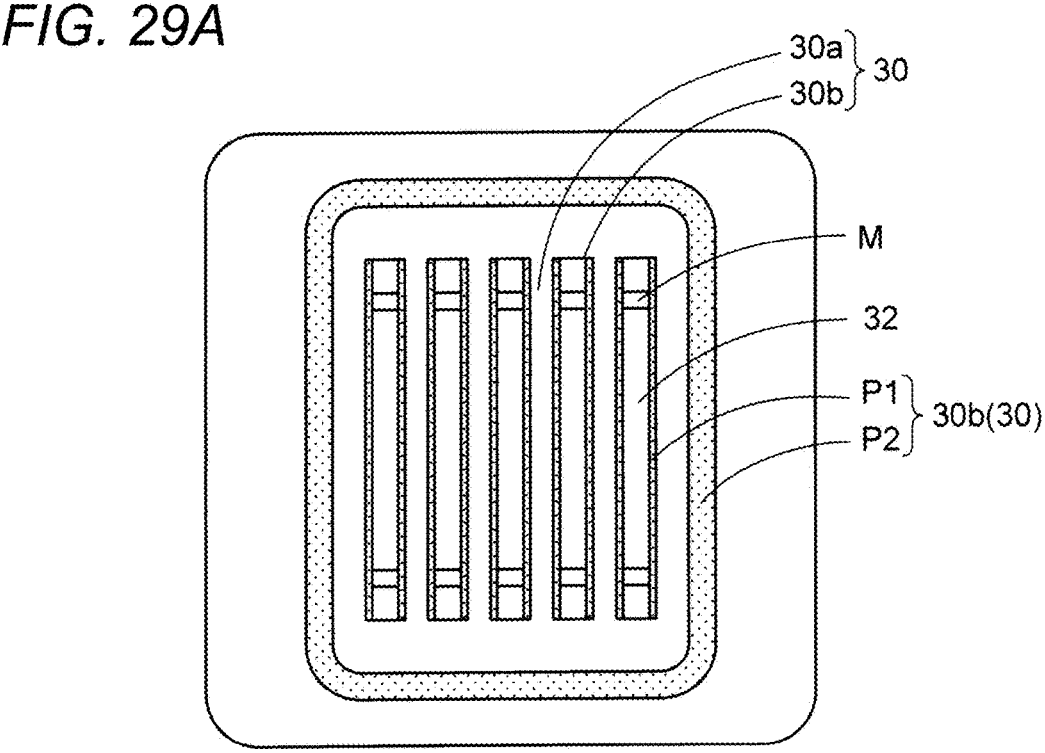
FIG. 29A is a plan view (Part 4) showing the method for manufacturing the optical waveguide apparatus according to the third embodiment.
Figure 29B:
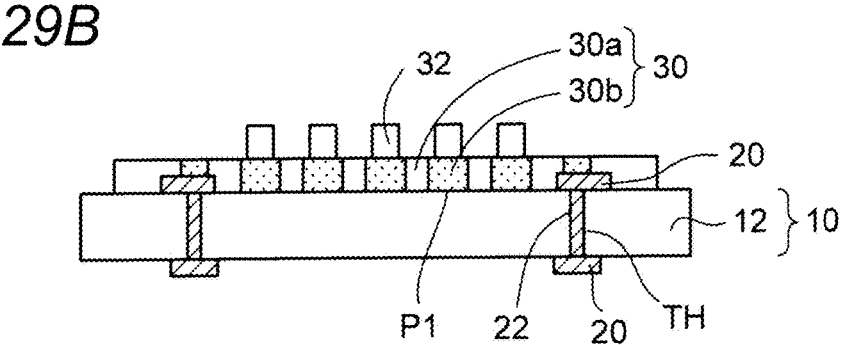
FIG. 29B is a sectional view (Part 4) showing the method for manufacturing the optical waveguide apparatus according to the third embodiment.

Next, as shown in FIGS. 29A and 29B, core layers 32 are formed on the first clad layer 30 by a method similar to or the same as the aforementioned step of FIGS. 7A and 7B in the first embodiment. Further, by a method similar to or the same as the aforementioned step of FIGS. 8A and 8B, optical path converting mirrors M are formed on opposite end portions of each of the core layers 32.

The core layers 32 are disposed on the belt-like patterns P1 of the semi-cured portions 30b of the first clad layer 30 respectively. Each of the belt-like patterns P1 of the semi-cured portions 30b of the first clad layer 30 is set to be wider than each of the core layers 32. In addition, the belt-like pattern P1 of the semi-cured portion 30b of the first clad layer 30 is set to be as long as or longer than the core layer 32.

Figure 30A:
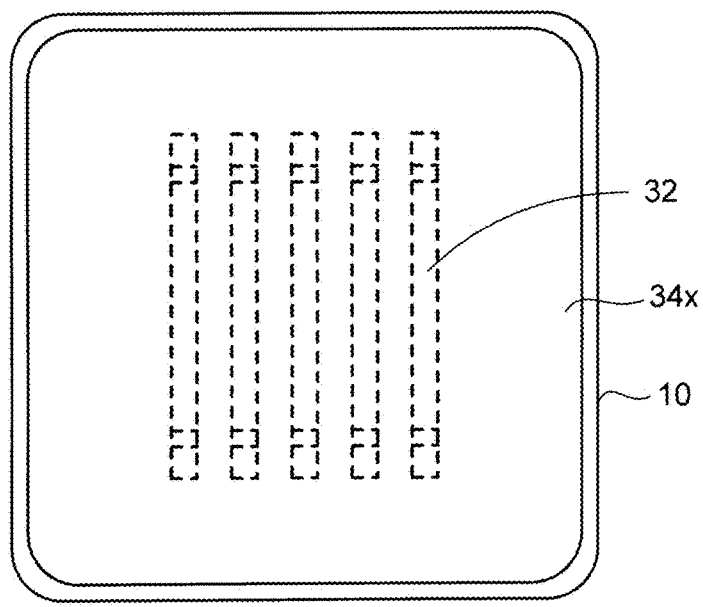
FIG. 30A is a plan view (Part 5) showing the method for manufacturing the optical waveguide apparatus according to the third embodiment.
Figure 30B:
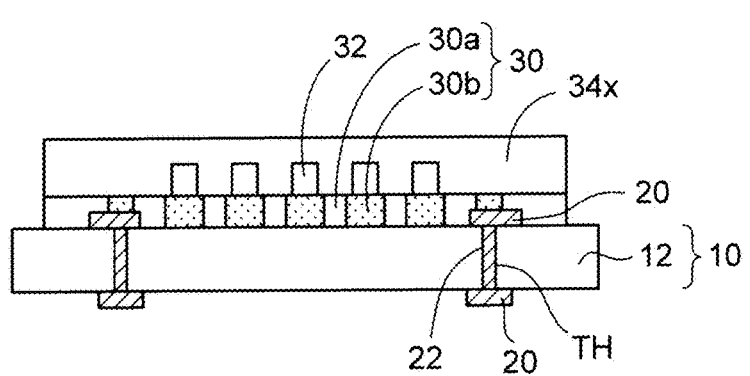
FIG. 30B is a sectional view (Part 5) showing the method for manufacturing the optical waveguide apparatus according to the third embodiment.

Next, as shown in FIGS. 30A and 30B, a photocurable resin 34x which is uncured without being subjected to irradiation with ultraviolet light and heat treatment is formed on the first clad layer 30 and the core layers 32.

Figure 31:
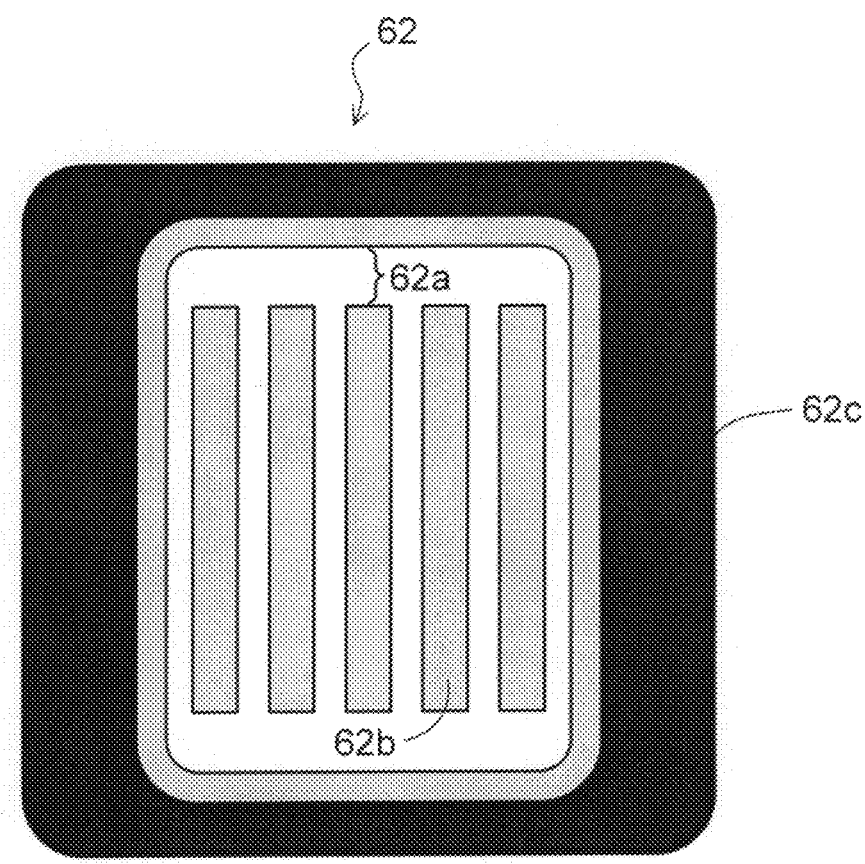
FIG. 31 is a plan view (Part 6) showing the method for manufacturing the optical waveguide apparatus according to the third embodiment.

Further, as shown in FIG. 31, a second gray-tone mask 62 is prepared. The second gray-tone mask 62 includes a light transmitting portion 62a, light semi-transmitting portions 62b, and a light shielding portion 62c. The light transmitting portion 62a and the light semi-transmitting portions 62b in the second gray-tone mask 62 are disposed in regions corresponding to one of the light transmitting portions 60a and the light semi-transmitting portions 60b in the first gray-tone mask 60 respectively.

In addition, the light shielding portion 62c of the second gray-tone mask 62 is disposed in a peripheral edge portion surrounding the frame-like light semi-transmitting portion 62b.

The photocurable resin 34x of FIG. 30A is irradiated with ultraviolet light through the light transmitting portion 62a and the light semi-transmitting portions 62b of the second gray-tone mask 62. Further, the photocurable resin 34x which has been exposed to the light is subjected to heat treatment at a temperature of 100° C. to 150° C.

On this occasion, light exposure conditions and heating conditions are adjusted in a manner similar to or the same as the formation of the first clad layer 30 so that a region of the photocurable resin 34x corresponding to the light transmitting portion 62a of the second gray-tone mask 62 can be completely cured and fully cured.

In addition, light exposure conditions and heating conditions are also adjusted so that regions of the photocurable resin 34x corresponding to the light semi-transmitting portions 62b of the second gray-tone mask 62 can be turned into a semi-cured state.

Figure 32:
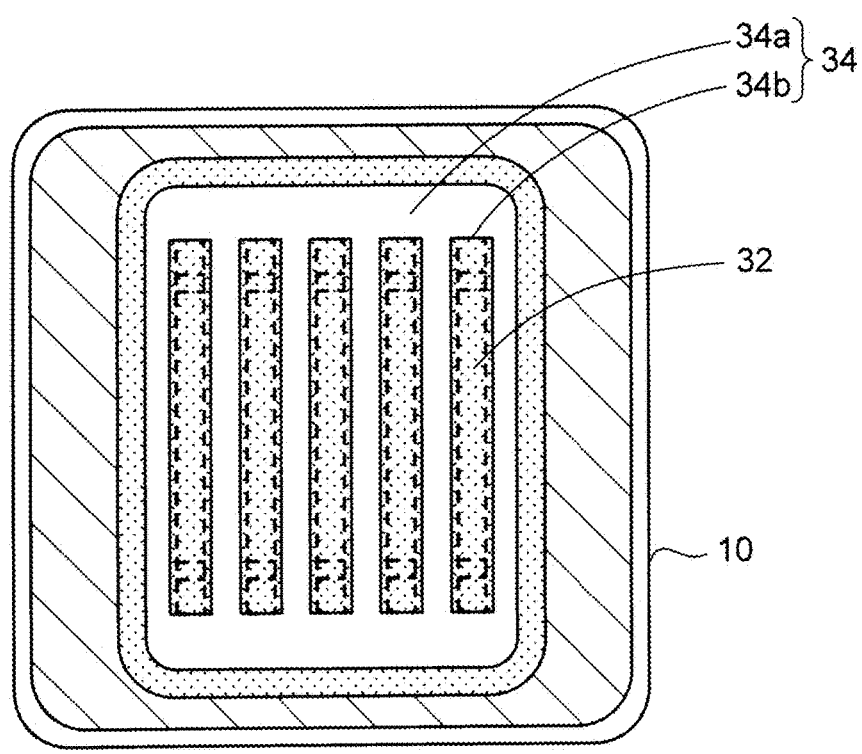
FIG. 32 is a plan view (Part 7) showing the method for manufacturing the optical waveguide apparatus according to the third embodiment.

Thus, as shown in FIG. 32, the region of the photocurable resin 34x which has been exposed to the light through the light transmitting portion 62a of the second gray-tone mask 62 is completely cured and formed into a fully cured portion 34a (white blank region). Simultaneously, the regions of the photocurable resin 34x which have been exposed to the light through the light semi-transmitting portions 62b of the second gray-tone mask 62 are formed into semi-cured portions 34b (dot regions).

Then, the photocurable resin 34x of FIG. 32 is processed by a developer so that, of the photocurable resin 34x, the peripheral edge portion (diagonally hatched region) which is unexposed to the light is dissolved and removed, as shown in FIG. 33.

Thus, a second clad layer 34 including the fully cured portion 34a and the semi-cured portions 34b is formed. The fully cured portion 34a and the semi-cured portions 34b in the second clad layer 34 are disposed in the regions corresponding to one of the fully cured portions 30a and the semi-cured portions 30b in the first clad layer 30.

The semi-cured portions 34b of the second clad layer 34 include belt-like patterns P1x which are formed to cover upper surfaces and side surfaces of the core layers 32, and a frame-like pattern P2x which is disposed to surround a rectangular region in which the core layers 32 have been disposed.

The fully cured portion 34a is disposed in the region between adjacent ones of the belt-like patterns P1x of the semi-cured portions 34b of the second clad layer 34 and between the belt-like patterns P1x and the frame-like pattern P2x.

In this manner, the second clad layer 34 having the fully cured portion 34a, and the semi-cured portions 34b covering the upper surfaces and the side surfaces of the core layers 32 respectively is formed.

Incidentally, also in the second clad layer 34, the fully cured portion 34a and the semi-cured portions 34b may be formed by light exposure performed twice in a manner similar to or the same as that in the first embodiment.

In this case, first, a center portion of the photocurable resin 34x of FIG. 30A is exposed to light through a first photomask to be turned into a semi-cured state. Then, the photocurable resin 34x is exposed to light through a second photomask which includes a light transmitting portion corresponding to the fully cured portion 34a and light shielding portions corresponding to the semi-cured portions 34b. Thus, the fully cured portion 34a is obtained.

In the aforementioned manner, an optical waveguide apparatus 1b according to the third embodiment be obtained, as shown in FIG. 34.

As shown in FIG. 33 and FIG. 34, the optical waveguide apparatus 1b according to the third embodiment is provided with the aforementioned wiring substrate 10 which has been described in FIGS. 5A and 5B.

The first clad layer 30 is formed on the wiring substrate 10. The first clad layer 30 includes the fully cured portions 30a and the semi-cured portions 30b. Refer to the aforementioned FIGS. 28A and 28B additionally. The semi-cured portions 30b of the first clad layer 30 are formed to include the belt-like patterns P1 and the frame-like pattern P2 which is disposed to surround the belt-like patterns P1.

In addition, the fully cured portions 30a of the first clad layer 30 are disposed in the regions between adjacent ones of the belt-like patterns P1 of the semi-cured portions 30b, the region between the belt-like patterns P1 and the frame-like pattern P2, and the region surrounding the belt-like pattern P2.

The core layers 32 are disposed on the belt-like patterns P1 of the semi-cured portions 30b of the first clad layer 30 respectively. The optical path converting mirrors M (FIG. 29A) are formed on the opposite end portions of each of the core layers 32. Each of the belt-like patterns P1 of the semi-cured portions 30b of the first clad layer 30 is set to be wider than each of the core layers 32.

Further, the second clad layer 34 is formed on the first clad layer 30 and the core layers 32.

The second clad layer 34 is provided with the fully cured portion 34a and the semi-cured portions 34b. As shown in FIG. 33, the semi-cured portions 34b of the second clad layer 34 are formed to include the belt-like patterns P1x and the frame-like pattern P2x. The belt-like patterns P1x and the frame-like pattern P2x of the semi-cured portions 34b of the second clad layer 34 are disposed correspondingly to the belt-like patterns P1 and the frame-like pattern P2 of the semi-cured portions 30b of the first clad layer 30.

As shown in FIG. 34, the belt-like patterns P1x of the semi-cured portions 34b of the second clad layer 34 are disposed on the belt-like patterns P1 of the semi-cured portions 30b of the first clad layer 30 respectively. Each of the belt-like patterns P1x of the semi-cured portions 34b of the second clad layer 34 is set to be wider than each of the core layers 32. The core layers 32 are embedded in the belt-like patterns P1x of the semi-cured portions 34b of the second clad layer 34 respectively.

In addition, the fully cured portion 34a is disposed in the region between adjacent ones of the belt-like patterns of the semi-cured portions 34b of the second clad layer 34 and between the belt-like patterns P1x and the frame-like pattern P2x.

In the second clad layer 34, no fully cured portion is formed in the region surrounding the frame-like pattern P2x of the semi-cured portion 34b, and side surfaces of the frame-like pattern P2x of the semi-cured portion 34b are formed as outer ends and exposed to the outside.

An optical waveguide 5 is configured by the first clad layer 30, the core layers 32 and the second clad layer 34. Lower surfaces of the core layers 32 each shaped like a rectangle in section are covered with the semi-cured portions 30b of the first clad layer 30. The upper surfaces and the side surfaces of the core layers 32 are covered with the semi-cured portions 34b of the second clad layer 34.

The first clad layer 30 and the second clad layer 34 are disposed on each other in a state in which the belt-like patterns P1 of the semi-cured portions 30b of the first clad layer 30 contact the belt-like patterns P1x of the semi-cured portions 34b of the second clad layer 34.

The optical waveguide apparatus 1b according to the third embodiment has effects similar to or the same as those of the optical waveguide apparatus 1a according to the second embodiment.

In addition, the core layers 32 are disposed on the semi-cured portions 30b of the first clad layer 30 respectively. The upper surfaces and the side surfaces of the core layers 32 are covered with the semi-cured portions 34b of the second clad layer 34 respectively.

Thus, the lower surfaces of the core layers 32 contact the semi-cured portions 30b of the first clad layer 30 respectively, and the upper surfaces of the side surfaces of the core layers 32 contact the semi-cured portions 34b of the second clad layer 34 respectively.

Thus, the first clad layer 30 has the fully cured portions 30a and the semi-cured portions 30b. The core layers 32 are disposed on the semi-cured portions 30b of the first clad layer 30 respectively. Further, the second clad layer 34 has the fully cured portion 34a, and the semi-cured portions 34b which cover the upper surfaces and the side surfaces of the core layers 32.

Therefore, even when stress is applied to the core layers 32, the stress can be dispersed by the semi-cured portions 30b of the first clad layer 30 and the semi-cured portions 34b of the second clad layer 34. Thus, cracking can be prevented from occurring in the first clad layer 30 or the second clad layer 34 can be prevented from being peeled off.

Further, one of the fully cured portions 30a is disposed between adjacent ones of the semi-cured portions 30b of the first clad layer 30, and the fully cured portion 34a is disposed between adjacent ones of the semi-cured portions 34b of the second clad layer 34.

In this manner, the fully cured portion 30a of the first clad layer 30 and the fully cured portion 34a of the second clad layer 34 are disposed on each other in the regions between adjacent ones of the core layers 32. Therefore, fixed strength of the optical waveguide 5 can be secured.

Figure 35:
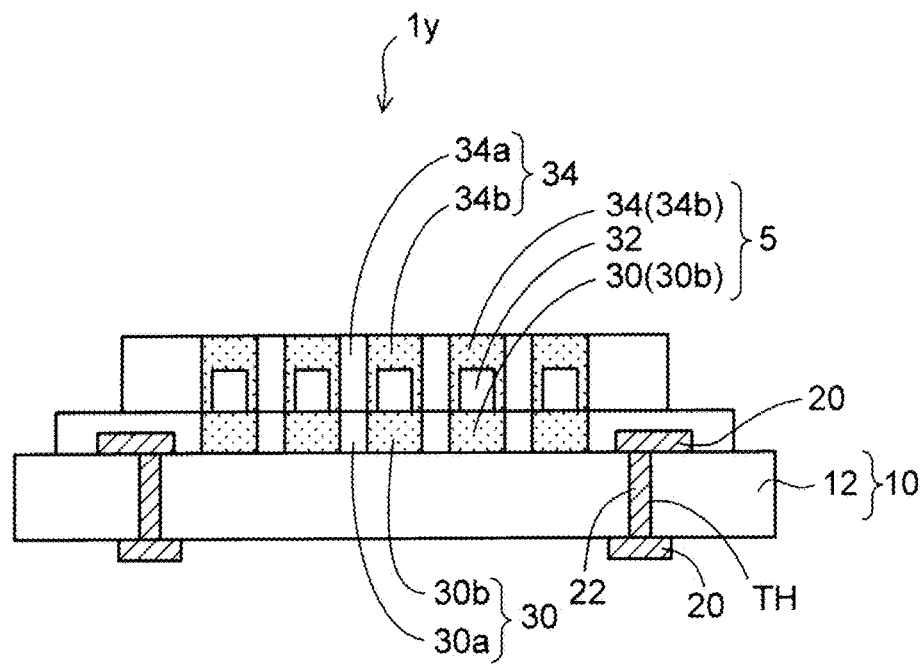
FIG. 35 is a sectional view showing an optical waveguide apparatus according to a modification of the third embodiment.

An optical waveguide apparatus according to a modification of the third embodiment is shown in FIG. 35. As shown in FIG. 35, the frame-like pattern P2 of the semi-cured portion 30b of the first clad layer 30 in the aforementioned optical waveguide apparatus 1b shown in FIG. 34 is changed to a fully cured portion 30a in the optical waveguide apparatus 1y according to the modification of the third embodiment. In addition, the frame-like pattern P2x of the semi-cured portion 34b of the second clad layer 34 in the aforementioned optical waveguide apparatus 1b is changed to a fully cured portion 34a in the optical waveguide apparatus 1y.

Thus, the semi-cured portions 30b and 34b of the first and second clad layers 30 and 34 may be disposed only around core layers 32 respectively so that the frame-like patterns P2 and P2x of the semi-cured portions 30b and 34b can be omitted.

Stress to be applied to an optical waveguide 5 can be reduced by the semi-cured portions 30b of the first clad layer 30 and the semi-cured portions 34b of the second clad layer 34 with both of which the core layers 32 are covered respectively.

Fourth Embodiment

Next, a method for mounting optical devices on the aforementioned optical waveguide apparatus 1 shown in FIG. 13 in the first embodiment will be described.

Figure 36:
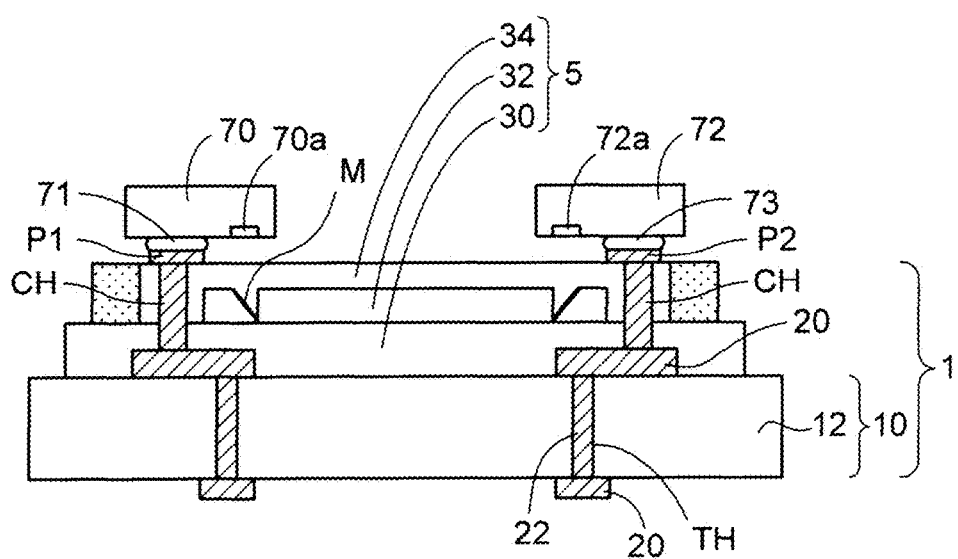
FIG. 36 is a sectional view showing a state in which optical devices are mounted on the optical waveguide apparatus according to the first embodiment.

In FIG. 36, an optical waveguide 5 is illustrated as a section taken in the depth direction of the optical waveguide 5 shown in FIG. 13. As shown in FIG. 36, connection holes CH are formed in the second clad layer 34 and the first clad layer 30 of the optical waveguide apparatus 1 of FIG. 13 to reach one of the wiring layers 20 of the wiring substrate 10.

Further, first pads P1 and second pads P2 are formed on the second clad layer 34 to be connected to the wiring layer 20 through via conductors with which the connection holes CH are filled. The first pads P1 are disposed on one end sides of the core layers 32 of the optical waveguide apparatus 1 while the second pads P2 are disposed on the other end sides of the same.

Light-emitting devices 70 are connected to the first pads P1 on the one end sides of the core layers 32 through solder electrodes 71. The light-emitting devices 70 are an example of the optical devices.

Each of the light-emitting devices 70 is provided with a light emitting portion 70a at its lower surface. The light-emitting portion 70a is optically coupled to a corresponding one of the optical path converting mirrors M of the optical paths of the optical waveguide apparatus 1. As the light-emitting device 70, a vertical cavity surface emitting laser (VCSEL) is preferably used.

In addition, light-receiving devices 72 are connected to the second pads P2 on the other end sides of the core layers 32 through solder electrodes 73. The light-receiving devices 72 is an example of the optical devices.

Each of the light-emitting devices 72 is provided with a light-receiving portion 72a at its lower surface. The light-receiving portion 72a is optically coupled to a corresponding one of the optical path converting mirrors M of the optical paths of the optical waveguide apparatus 1. As light-receiving device 72, a photodiode is preferably used.

An underfill resin is filled in each of lower sides of the light-emitting devices 70 and the light-receiving devices 72.

In the optical waveguide apparatus 1 according to the embodiment, an electric signal outputted from a driver device (not shown) is supplied to one of the light-emitting devices 70 so that light can be emitted downward from a corresponding light-emitting portion 70a of the light-emitting device 70.

Light emitted from the light-emitting device 70 is transmitted through the second clad layer 34 to reach a corresponding optical path converting mirror M of the optical waveguide apparatus 1. Further, the light is reflected by the optical path converting mirror M so that an optical path of the light is converted by 90° to be incident on a corresponding core layer 32.

Next, the light entering the core layer 32 is totally reflected repeatedly and travels in the core layer 32 to thereby reach a corresponding optical path converting mirror M on the other end side. The light is reflected by the optical path converting mirror M on the other end side so that the optical path is converted by 90°. Then, the light is transmitted through the second clad layer 34 to be incident on a corresponding light-receiving portion 72a of a light-receiving device 72.

The light-receiving element 72 converts the optical signal into an electric signal so that the electric signal can be supplied to an amplifier device (not shown).

In the optical waveguide apparatus 1 according to the embodiment, stress to be applied to the optical waveguide 5 can be reduced, as described above. Accordingly, a manufacturing yield and reliability can be improved.

As described above, the exemplary embodiment and the modification are described in detail. However, the present invention is not limited to the above-described embodiment and the modification, and various modifications and replacements are applied to the above-described embodiment and the modifications without departing from the scope of claims.

Various aspects of the subject matter described herein are set out non-exhaustively in the following numbered clauses:

1) A method of manufacturing an optical waveguide apparatus, the method comprising:
   a) forming a first clad layer on a substrate;
   b) forming a core layer on the first clad layer; and
   c) forming a second clad layer on the first clad layer so as to cover the core layer,
   wherein at least one of the first clad layer and the second clad layer comprises a fully cured portion and a semi-cured portion.

2) The method according to the clause (1), wherein
   the fully cured portion comprises a second fully cured portion which is formed in the second clad layer,
   the semi-cured portion comprises a second semi-cured portion which is formed in the second clad layer,
   the second fully cured portion covers the core layers, and
   the second semi-cured portion surrounds at least a portion of an outer periphery of the second fully cured portion, and contacts the first clad layer.

3) The method according to clause (1), wherein
   the fully cured portion comprises a first fully cured portion which formed the first clad layer,
   the semi-cured portion comprises a first semi-cured portion which is formed in the first clad layer, and
   the first semi-cured portion is formed into a frame shape in plan view, and contacts an outer peripheral portion of the second clad layer.

4) The method according to the clause (1), wherein
   the fully cured portion comprises a first fully cured portion which is formed in the first clad layer, and a second fully cured portion which is formed in the second clad layer,
   the semi-cured portion comprise first semi-cured portions which are formed in the first dad layer, and second semi-cured portions which are formed in the second dad layer,
   the core layer comprises a plurality of core layers,
   each of the core layers contacts a corresponding one of the first semi-cured portions, and
   each of the second semi-cured portions covers a corresponding one of the core layers.

5) The method according to the clause (2), wherein
   the step c) comprises:
   c1) forming a photocurable resin;
   c2) irradiating the photocurable resin with ultraviolet light through a first photomask so as to semi-cure the photocurable resin, wherein the first photomask comprises a first light transmitting portion at a center portion of the first photomask; and
   c3) irradiating the photocurable resin with ultraviolet light through a second photomask so as to fully cure the photocurable resin, wherein the second photomask comprises a second light transmitting portion that is smaller in size than the first light transmitting portion.

6) The method according to the clause (4), wherein
   the step c) comprises:
   c4) forming a photocurable resin; and
   c5) irradiating the photocurable resin with ultraviolet light through a photomask, wherein the photomask comprises a light transmitting portion and light semi-transmitting portions,
   the second fully cured portion is obtained from a portion of the photocurable resin that is opposed to the light transmitting portion of the photomask, and
   the second semi-cured portions are obtained from portions of the photocurable resin that are opposed to the light semi-transmitting portions of the photomask.

What is claimed is:

1. An optical waveguide apparatus comprising:
   a first clad layer;
   a core layer formed on a surface of the first clad layer; and
   a second clad layer formed on the first clad layer to cover the core layer and such that the surface of the first clad layer on which the core layer is formed is partially exposed from the second clad layer,
   wherein
   at least one of the first clad layer and the second clad layer comprises a fully cured portion and a semi-cured portion,
   the fully cured portion comprises a second fully cured portion which is formed in the second clad layer,
   the semi-cured portion comprises a second semi-cured portion which is formed in the second clad layer,
   the second fully cured portion covers the core layer, and
   the second semi-cured portion surrounds at least a portion of an outer periphery of the second fully cured portion, and contacts the first clad layer.

2. The optical waveguide apparatus according to claim 1, wherein:
   the first clad layer and the second clad layer are formed of a photocurable resin.

3. The optical waveguide apparatus according to claim 1, wherein
   a crosslinking ratio of the semi-cured portion is in a range of 10% to 80% as high as a crosslinking ratio of the fully cured portion.

4. The optical waveguide apparatus according to claim 1, wherein
   the core layer is provided with an optical path converting mirror configured to convert an optical path, and
   the optical waveguide apparatus further comprises an optical device which is optically coupled to the optical path converting mirror.

5. An optical waveguide apparatus comprising:
   a first clad layer;
   a core layer formed on a surface of the first clad layer; and
   a second clad layer formed on the first clad layer to cover the core layer and such that the surface of the first clad layer on which the core layer is formed is partially exposed from the second clad layer, wherein at least one of the first clad layer and the second clad layer comprises a fully cured portion and a semi-cured portion, the fully cured portion comprises a first fully cured portion which is formed in the first clad layer, the semi-cured portion comprises a first semi-cured portion which is formed in the first clad layer, and the first semi-cured portion is formed into a frame shape in plan view, and contacts an outer peripheral portion of the second clad layer.

6. The optical waveguide apparatus according to claim 5, wherein:

the first clad layer and the second clad layer are formed of a photocurable resin.

7. The optical waveguide apparatus according to claim 5, wherein a crosslinking ratio of the semi-cured portion is in a range of 10% to 80% as high as a crosslinking ratio of the fully cured portion.

8. The optical waveguide apparatus according to claim 5, wherein the core layer is provided with an optical path converting mirror configured to convert an optical path, and the optical waveguide apparatus further comprises an optical device which is optically coupled to the optical path converting mirror.

9. An optical waveguide apparatus comprising:

a first clad layer;

a core layer formed on the first clad layer; and a second clad layer formed on the first clad layer to cover the core layer, wherein at least one of the first clad layer and the second clad layer comprises a fully cured portion and a semi-cured portion, the fully cured portion comprises a first fully cured portion which is formed in the first clad layer, and a second fully cured portion which is formed in the second clad layer, the semi-cured portion comprises first semi-cured portions which are formed in the first clad layer, and second semi-cured portions which are formed in the second clad layer, the core layer comprises a plurality of core layers, each of the core layers contacts a corresponding one of the first semi-cured portions, and each of the second semi-cured portions covers a corresponding one of the core layers.

10. The optical waveguide apparatus according to claim 9, wherein:

the first clad layer and the second clad layer are formed of a photocurable resin.

11. The optical waveguide apparatus according to claim 9, wherein a crosslinking ratio of the semi-cured portion is in a range of 10% to 80% as high as a crosslinking ratio of the fully cured portion.

12. The optical waveguide apparatus according to claim 9, wherein the core layer is provided with an optical path converting mirror configured to convert an optical path, and the optical waveguide apparatus further comprises an optical device which is optically coupled to the optical path converting mirror.

* * * * *